(12) United States Patent
Takase et al.

(10) Patent No.: US 11,097,772 B2
(45) Date of Patent: Aug. 24, 2021

(54) MOTOR CONTROL UNIT AND ELECTRIC POWER STEERING APPARATUS EQUIPPED WITH THE SAME

(71) Applicant: NSK LTD., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/606,551

(22) PCT Filed: Jun. 12, 2018

(86) PCT No.: PCT/JP2018/022337
§ 371 (c)(1),
(2) Date: Oct. 18, 2019

(87) PCT Pub. No.: WO2018/230541
PCT Pub. Date: Dec. 20, 2018

(65) Prior Publication Data
US 2020/0130730 A1    Apr. 30, 2020

(30) Foreign Application Priority Data

Jun. 16, 2017  (JP) .............................. JP2017-118864
Jan. 9, 2018   (JP) .............................. JP2018-001463
Mar. 6, 2018   (JP) .............................. JP2018-039298

(51) Int. Cl.
*B62D 5/04*   (2006.01)
*H02P 21/18*  (2016.01)
(Continued)

(52) U.S. Cl.
CPC ............ *B62D 5/0463* (2013.01); *H02P 21/18* (2016.02); *H02P 27/08* (2013.01); *H02P 29/60* (2016.02)

(58) Field of Classification Search
CPC . B62D 6/00; B62D 5/046; H02M 1/38; H02P 7/00; H02P 21/18; H02P 29/60; H02P 27/08
See application file for complete search history.

(56) References Cited

U.S. PATENT DOCUMENTS

2007/0029959 A1* 2/2007 Ta ........................ B62D 5/046
                                                318/432
2013/0066524 A1* 3/2013 Kitazume ............... B62D 6/00
                                                701/42
2015/0251692 A1   9/2015 Mikamo et al.

FOREIGN PATENT DOCUMENTS

JP     2007-110827 A    4/2007
JP     2009-165279 A    7/2009
(Continued)

OTHER PUBLICATIONS

International Search Report for PCT/JP2018/022337 dated Sep. 11, 2018 (PCT/ISA/210).

*Primary Examiner* — Eduardo Colon Santana
*Assistant Examiner* — Said Bouziane
(74) *Attorney, Agent, or Firm* — Sughrue Mion, PLLC

(57) ABSTRACT

[Problem]
An object of the present invention is to provide a vector control type motor control unit that compensates a dead time of an inverter without a tuning operation, improves a distortion of a current waveform and responsibility of the current control, and suppresses sound, vibration and a torque ripple.
[Means for Solving the Problem]
The present invention is the vector control type motor control unit that calculates a q-axis control assist command
(Continued)

value, calculates dq-axes current command values from the control assist command value, converts the dq-axes current command values into 3-phase duty command values, and drives and controls a 3-phase brushless motor by a PWM-controlled inverter, wherein dead time compensation of the inverter is performed by calculating 3-phase dead time reference compensation values based on a motor rotational angle, calculating 3-phase dead time compensation values by temperature-correcting the 3-phase dead time reference compensation values, and adding the 3-phase dead time compensation values to 3-phase voltage command values after performing dq-axes space vector modulation.

23 Claims, 25 Drawing Sheets

(51) Int. Cl.
*H02P 29/60* (2016.01)
*H02P 27/08* (2006.01)

(56) References Cited

FOREIGN PATENT DOCUMENTS

| | | |
|---|---|---|
| JP | 4681453 B2 | 5/2011 |
| JP | 2012-231615 A | 11/2012 |
| JP | 2015-171251 A | 9/2015 |
| WO | 2012/169311 A1 | 12/2012 |

\* cited by examiner

PRIOR ART

PRIOR ART d-AXIS ANGLE-DEAD TIME REFERENCE COMPENSATION VALUE TABLE
(ELECTRIC ANGLE 0-359 [deg])

q-AXIS ANGLE-DEAD TIME REFERENCE COMPENSATION VALUE TABLE
(ELECTRIC ANGLE 0-359 [deg])

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2018/022337 filed Jun. 12, 2018, claiming priority based on Japanese Patent Application No. 2017-118864, filed Jun. 16, 2017, Japanese Patent Application No. 2018-001463 filed Jan. 9, 2018, and Japanese Patent Application No. 2018-039298, filed Mar. 6, 2018.

TECHNICAL FIELD

The present invention relates to a motor control unit that vector-controls a driving of a 3-phase brushless motor using a dq-axes rotational coordinate system, compensates a dead time of an inverter based on a function or a table of a motor rotational angle (an electrical angle) and depending on a temperature of a control section on which a power device is mounted (a temperature of the inverter or neighborhood of the inverter) and enables to perform a smooth control without a steering sound, and the electric power steering apparatus equipped with the above motor control unit.

BACKGROUND ART

There exists an electric power steering apparatus (EPS) which provides a steering mechanism of a vehicle with a steering assist torque (an assist torque) by means of a rotational torque of a motor, an electric vehicle, a machine tool and the like as an apparatus equipped with a motor control unit. The electric power steering apparatus applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering assist command value calculating section 31. The steering assist command value calculating section 31 calculates a steering assist command value Iref1 based on the steering torque Th and the vehicle speed Vs using an assist map or the like. The calculated steering assist command value Iref1 is added with a compensation signal CM for improving characteristics from a compensating section 34 at an adding section 32A. The steering assist command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

A deviation ΔI (=Irefm−Im) which is the subtracted result at the subtracting section 32B is current-controlled by a proportional integral (PI) and the like at a PI-control section 35. The voltage control command value Vref obtained by the current control, and a modulation signal (a triangle wave carrier) CF are inputted into a PWM-control section 36, and a duty command value is calculated. The motor 20 is PWM-driven by an inverter 37 with a PWM signal calculated the duty command value. The motor current value Im of the motor 20 is detected by a motor current detector 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM and the control characteristics are improved.

Recently, a 3-phase brushless motor is mainly used as an actuator of the electric power steering apparatus and the like, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (for example, a field-effect transistor (FET)) has a delay time when the operation is turned-OFF, a direct current link is shorted when the switching devices of an upper-arm and a lower-arm simultaneously switches a turned-OFF operation and a turned-ON operation. In order to prevent the above problem, a time (a dead time) that the operations of the switching devices of both arms are turned-OFF, is set.

As a result, a current waveform is distorted, and a responsibility of the current control and a steering feeling are badly affected. For example, when the driver slowly steers the handle in a situation that the handle is around a straight running state (an on-center state), a discontinuous steering feeling by means of the torque ripple and like is occurred. Because the back-EMF of the motor in a middle speed or a high speed steering, and the interference voltage between the windings operate as the disturbance against the current control, a steering follow-up performance and the steering feeling in the turn-back steering are badly affected.

A q-axis that is a coordinate axis of the rotor of the 3-phase brushless motor and controls the torque of a rotor of the 3-phase brushless motor, and a d-axis that controls strength of a magnetic field are independently set. Since the d-axis crosses at 90° against the q-axis, the vector control system that controls the vectors corresponding to the respective axes currents (a d-axis current command value and a q-axis current command value) is known.

FIG. 3 shows a configuration example of driving and controlling the 3-phase brushless motor 100 by using the vector control system. Steering-assist command values ($I_{ref2}$ ($i_{dref}$ and $i_{qref}$)) (control assist command values) of the two-axes (the dq-axes coordinate system) that are calculated based on the steering torque Th, the vehicle speed Vs and the like, are calculated. The d-axis current command value $i_d^*$ and the q-axis current command value $i_q^*$ whose max values are limited are inputted into the subtracting sections 131$d$ and 131$q$, respectively. The current deviations $\Delta i_d^*$ and $\Delta i_q^*$ that are calculated at the subtracting sections 131$d$ and 131$q$ are inputted into the proportional integral control sections (PI-control sections) 120$d$ and 120$q$, respectively. The voltage command values $v_d$ and $v_q$ that are PI-controlled at the PI-control sections 120$d$ and 120$q$ are inputted into the subtracting section 141$d$ and the adding section 141$q$, respectively. Voltage deviations $\Delta v_d$ and $\Delta v_q$ that are calculated at the subtracting section 141$d$ and the adding section 141$q$ are inputted into a dq-axes/3-phase alternating current (AC) converting section 150. The voltage command values Vu*, Vv* and Vw* that are converted into the three phases at the dq-axes/3-phase AC converting section 150 are inputted into the PWM-control section 160. The motor 100 is driven with PWM-signals $U_{PWM}$, $V_{PWM}$ and $W_{PWM}$ based on the calculated 3-phase duty command values $Duty_u$, $Duty_v$ and $Duty_w$ via the inverter (inverter applying voltage VR) 161 constituted by a bridge configuration of an upper-arm and a lower-arm as shown in FIG. 4. The upper-arm comprises FETs Q1, Q3 and Q5 serving as switching devices and the lower-arm comprises FETs Q2, Q4 and Q6.

3-phase motor currents $i_u$, $i_v$ and $i_w$ of the motor 100 are detected at the current detector 162, and the detected 3-phase currents $i_u$, $i_v$ and $i_w$ are inputted into the 3-phase AC/dq-axes converting section 130. The 2-phase feed-back currents $i_d$ and $i_q$ that are converted at the 3-phase AC/dq-axes converting section 130 are subtraction-inputted into the subtracting sections 131$d$ and 131$q$, and a d-q decoupling control section 140. The rotational sensor or the like is attached to the motor 100, and the motor rotational angle θ and the motor rotational speed (the motor rotational velocity) ω are outputted from the angle detecting section 110 that processes a sensor signal. The motor rotational angle θ is inputted into the dq-axes/3-phase AC converting section 150 and the 3-phase AC/dq-axes converting section 130, and the motor rotational speed ω is inputted into the d-q decoupling control section 140. 2-phase voltages $v_{d1}^*$ and $v_{q1}^*$ from the d-q decoupling control section 140 are inputted into the subtracting section 141$d$ and the adding section 141$q$, respectively, and the command voltages $\Delta v_d$ and $\Delta v_q$ are calculated in the subtracting section 141$d$ and the adding section 141$q$. The command voltages $\Delta v_d$ and $\Delta v_q$ are inputted into the dq-axes/3-phase AC converting section 150, and the motor 100 is driven via the PWM-control section 160 and the inverter 161.

The vector control type electric power steering apparatus described above is an apparatus to assist the steering of the driver, and a sound and a vibration of the motor, a torque ripple and the like are transmitted to the driver as a force sense via the handle. The field-effect transistors (FETs) are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]-100 [ns], "ON"-"ON") that the upper-FET is "ON" and the lower-FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, as a method to compensate the dead time of the inverter, there are methods to add the compensation value to the dead time by detecting a timing occurring the dead time and to compensate the dead time by a disturbance observer on the dq-axes in the current control.

The electric power steering apparatus to compensate the dead time of the inverter is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensation circuit is a changing value in proportion to the model current in a region being a predetermined fixed value or less, and is an addition value of the changing values in proportion to the model current and the fixed value in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

The present invention has been developed in view of the above-described circumstances, and an object of the present invention is to provide the vector control type motor control unit that compensates the dead time of the inverter without the tuning operation, improves the distortion of the current waveform and the responsibility of the current control, and suppresses the sound, the vibration and the torque ripple, and the electric power steering apparatus equipped with the motor control unit.

Means for Solving the Problems

The present invention relates to a vector control type motor control unit that calculates dq-axes control assist command values, calculates dq-axes current command values from the dq-axes control assist command values, converts the dq-axes current command values into 3-phase duty command values, and drives and controls a 3-phase brushless motor by an inverter of a pulse width modulation (PWM) control, the above-described object of the present invention is achieved by that: wherein a dead time compensation of the inverter is performed by calculating 3-phase dead time reference compensation values based on a motor rotational angle, calculating 3-phase dead time compensation values by temperature-correcting the 3-phase dead time reference compensation values, and adding the 3-phase dead time compensation values to 3-phase voltage command values after performing a dq-axes space vector modulation.

The above-described object of the present invention is achieved by:
a vector control type motor control unit that calculates dq-axes control assist command values, calculates dq-axes current command values from the dq-axes control assist command values, converts the dq-axes current command values into 3-phase duty command values, and drives and controls a 3-phase brushless motor by an inverter, which is constituted by abridge circuit of field-effect transistors (FETs), of a pulse width modulation (PWM) control, comprising a space vector modulating section to obtain 3-phase voltage command values by performing a space vector modulation for the dq-axes current command values, an angle-dead time compensation value functional section to calculate 3-phase dead time reference compensation values based on a motor rotational angle, an inverter applying voltage sensitive-gain section to calculate a voltage sensitive gain based on an inverter applying voltage, a temperature detecting section to detect or estimate a temperature of a control section including the inverter, a temperature coefficient calculating section to output a temperature coefficient depending on the temperature, a current command value sensitive-gain calculating section to calculate a current command value sensitive gain in which compensation amounts of 3-phase dead time compensation values are variable depending on the dq-axes control assist command values, and a dead time compensation-value outputting section to multiply the 3-phase dead time reference compensation values by a voltage coefficient obtained by multiplying the voltage sensitive gain and the temperature coefficient together, multiply the multiplied results by the current command value sensitive gain and output the 3-phase dead time compensation values, wherein a dead time compensation of the inverter is performed by adding the 3-phase dead time compensation values to the 3-phase voltage command values;
or,
comprising an angle-dead time compensation value functional section to calculate 3-phase dead time reference compensation values based on a motor rotational angle, an inverter applying voltage sensitive-gain calculating section to calculate a voltage sensitive gain based on an inverter applying voltage, a temperature detecting section to detect or estimate a temperature of a control section including the inverter, a temperature coefficient calculating section to output a temperature coefficient depending on the temperature, and a dead time compensation-value outputting section to multiply the 3-phase dead time reference compensation values by a voltage coefficient obtained by multiplying the voltage sensitive gain and the temperature coefficient together, obtain dq-axes dead time compensation values by converting the multiplied results on dq-axes, and add the dq-axes dead time compensation values to the dq-axes voltage command values;
or,
comprising an angle-dead time reference compensation-value table section to calculate dq-axes dead time reference compensation values based on a motor rotational angle, an inverter applying voltage sensitive-gain calculating section to calculate a voltage sensitive gain based on an inverter applying voltage, a temperature detecting section to detect or estimate a temperature of a control section including the inverter, a temperature coefficient calculating section to output a temperature coefficient depending on the temperature, and a dead time compensation-value outputting section to obtain dq-axes dead time compensation values by multiplying the dq-axes dead time reference compensation values by a voltage coefficient obtained by multiplying the voltage sensitive gain and the temperature coefficient together, and output the dq-axes dead time compensation values.

Further, the above-described object of the present invention is efficiently achieved by an electric power steering apparatus that is equipped with the vector control type motor control unit, and applies an assist torque to a steering system of a vehicle.

Effects of the Invention

According to the motor control unit and the electric power steering apparatus of the present invention, the dead time of the inverter is compensated by calculating the dead time compensation value of the inverter based on the function or the table of the motor rotational angle (the electrical angle) and depending on the temperature of the control section on which the power devices are mounted (the temperature of the inverter or neighborhood of the inverter), and adding (feed-forwarding) the 3-phase dead time compensation values to the 3-phase voltage command values after performing the space vector modulation on the dq-axes, or adding (feed-forwarding) the dq-axes dead time compensation values to the dq-axes voltage command values. Thereby, the motor control unit accurately compensates the dead time of the inverter without the tuning operation, and improves the distortion of the current waveform and the responsibility of the current control. The motor control unit variably adjusts the magnitude and the direction of the dead time compensation value by using the control assist command value (the steering assist command value iqref) so as not to overcompensate the dead time compensation value.

Since the control is smoothly performed by using the reference dead time compensation based on the function (the 3-phase function or the dq-axes function) or the table of the motor rotational angle (the electric angle), the sound and the vibration of the motor and the torque ripple can be suppressed. Since the compensation accuracy of the motor control unit of the present invention is high in low speed and middle speed steering regions in which the motor angle is coincident with the phases of the 3-phase currents, the dead time of the inverter can be compensated even when the dq-axes compensation waveforms are not a rectangular wave.

MODE FOR CARRYING OUT THE INVENTION

Figure 1:
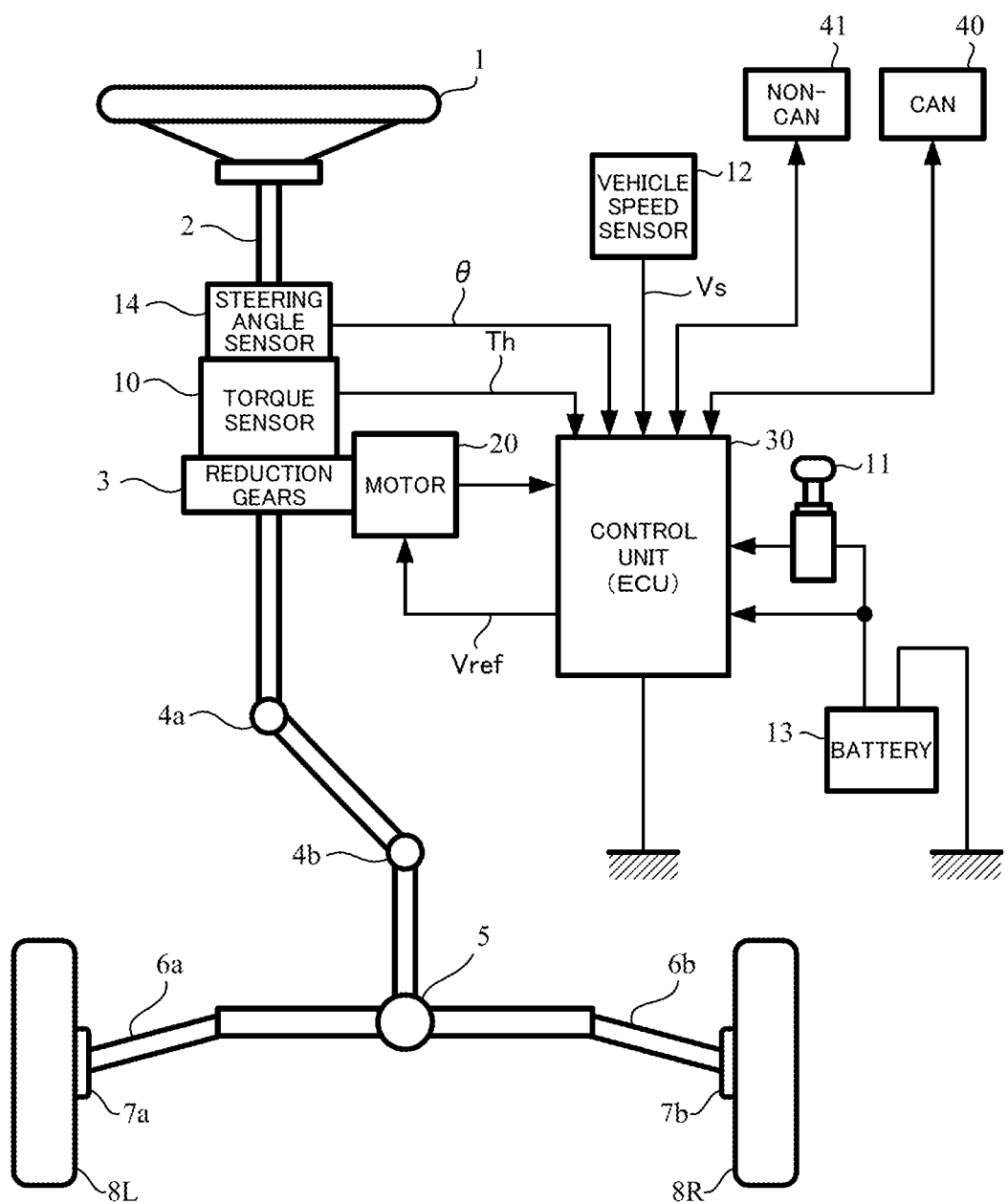
FIG. 1 is a configuration diagram showing a general outline of an electric power steering apparatus.

In order to resolve problems that a current distortion and a torque ripple occur and a steering sound is louder due to an influence of a dead time of switching devices in a control section such as an ECU, the present invention treats dead time compensation values as a function or a table of a motor rotational angle (an electrical angle), and performs a feed-forward compensation to dq-axes voltage command values by using dq-axes temperature-corrected dead time compensation values, or performs a feed-forward compensation to 3-phase space vector-modulated voltage command values by using 3-phase temperature-corrected dead time compensation values. That is, the 3-phase dead time compensation values or the dq-axes dead time compensation values are previously obtained by using the function or the table depending on the motor rotational angle (the electrical angle) in offline. The 3-phase angle-dead time compensation functional section or a dq-axes angle-dead time reference compensation-value table is created based on the output waveforms of the above compensation values. The dead time reference compensation values obtained by the function or the table are corrected depending on the temperature of the control section (the ECU) or the temperature of neighborhood of the control section (the ECU), and the temperature-corrected dead time compensation values are added to the dq-axes voltage command values or the 3-phase voltage command values by the feed-forward control. Thereby, the dead time of the inverter is more accurately compensated.

Adjustment of an appropriate compensation amount of the dead time compensation value and estimation of a compensation direction can be performed by using the assist command values. The correction is performed by using an inverter applying voltage and detecting or estimating the temperature of the control section such as the ECU on which the power devices are mounted (for example, the FETs) and then the compensation amount is adjusted, appropriately. The dead time compensation values by the motor rotational angle can be calculated on a real time, and the dead time compensation values depending on the motor rotational angle can be compensated by using the 3-phase voltage values or on the dq-axes.

In low speed and middle speed steering regions, there exists problems that a compensation deviation is occurred in amplitude of a particular phase current and the compensation deviation is occurred in the particular rotational speed in the motor control unit and the steering sound is louder and an uncomfortable steering feeling is enhanced in the EPS, in the conventional 3-phase dead time compensation. To adjust the timing in the conventional 3-phase dead time compensation, it is necessary to consider the magnitudes of the rotational velocity and the amplitude of the phase currents. The optimal adjustment that the both magnitudes are considered is difficult. In the conventional 3-phase dead time compensation, in a case that the 3-phase compensation waveforms are not a rectangular wave, there exists a problem that the compensation cannot accurately be performed. In order to resolve such problems, the present invention that has a great effect in the low speed steering state and the middle speed steering state and adopts the temperature correction, is proposed.

At first, a configuration example of the motor control unit on which the present invention relies will be described.

Figure 2:
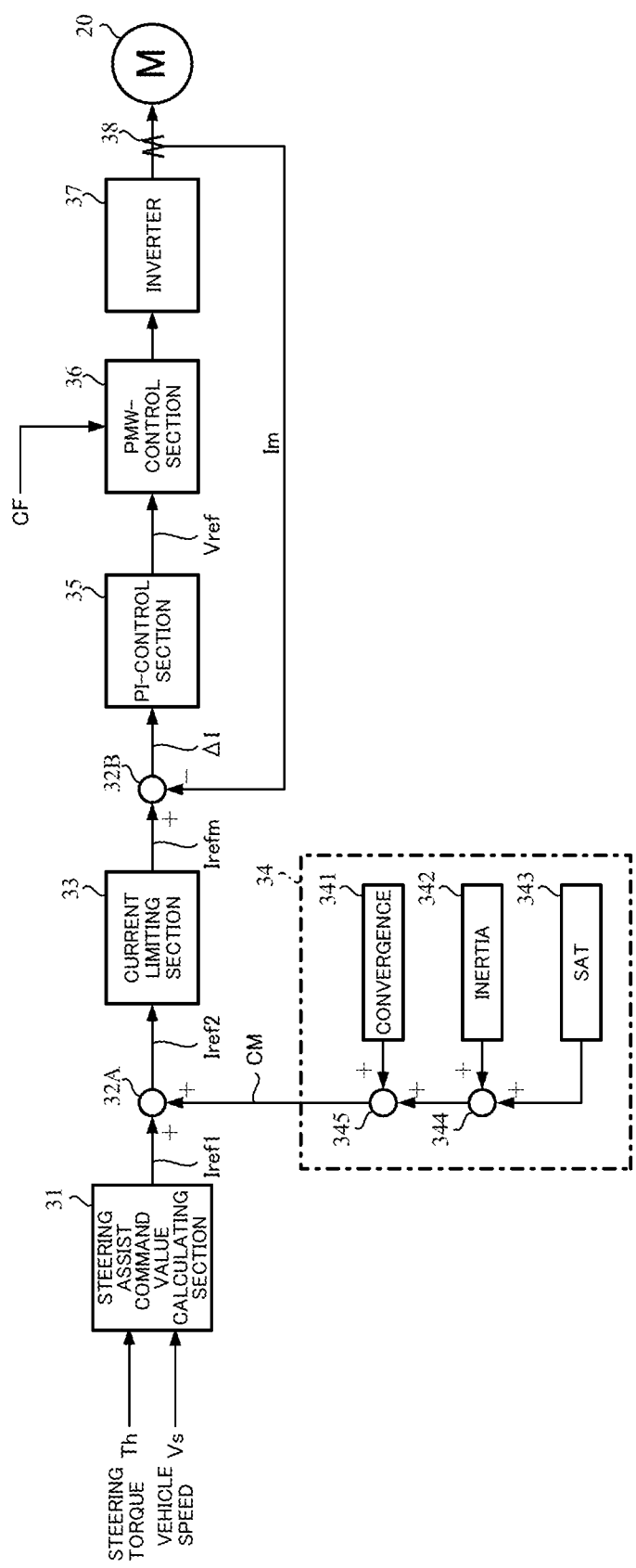
FIG. 2 is a block diagram showing a configuration example of a control system of the electric power steering apparatus.
Figure 3:
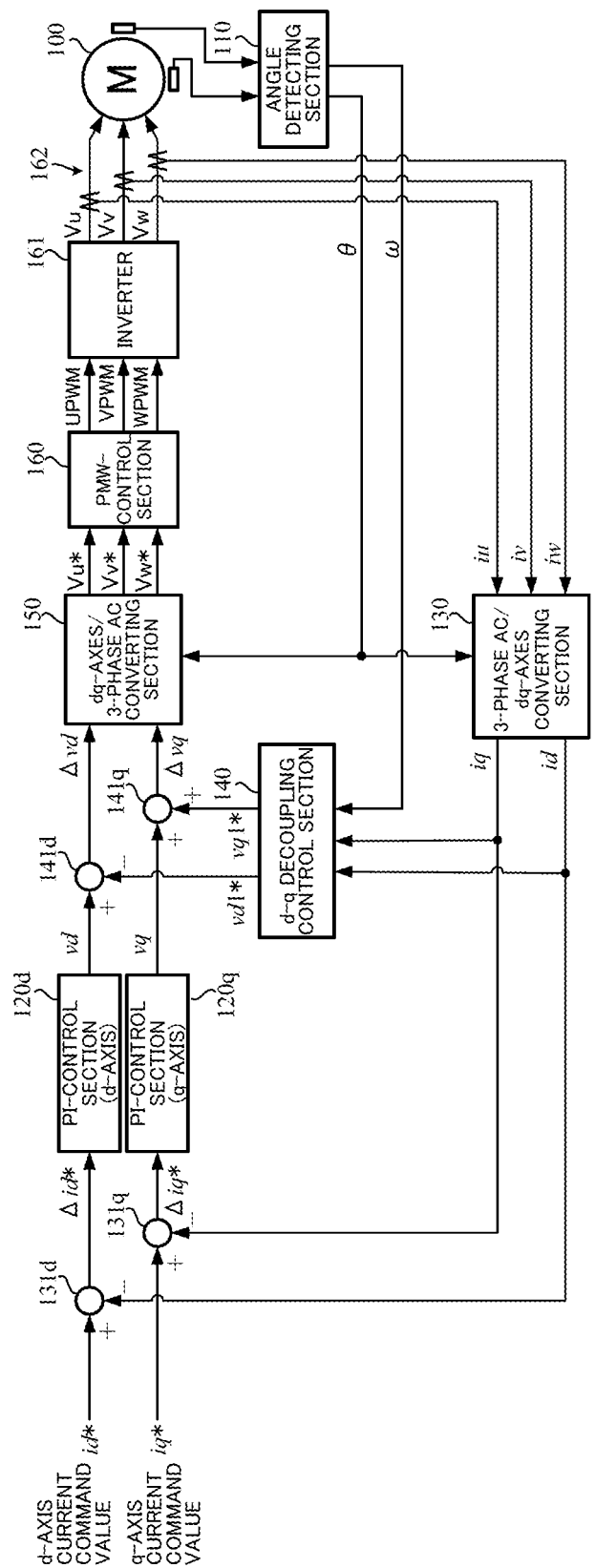
FIG. 3 is a block diagram showing a configuration example of a vector control system.
Figure 4:
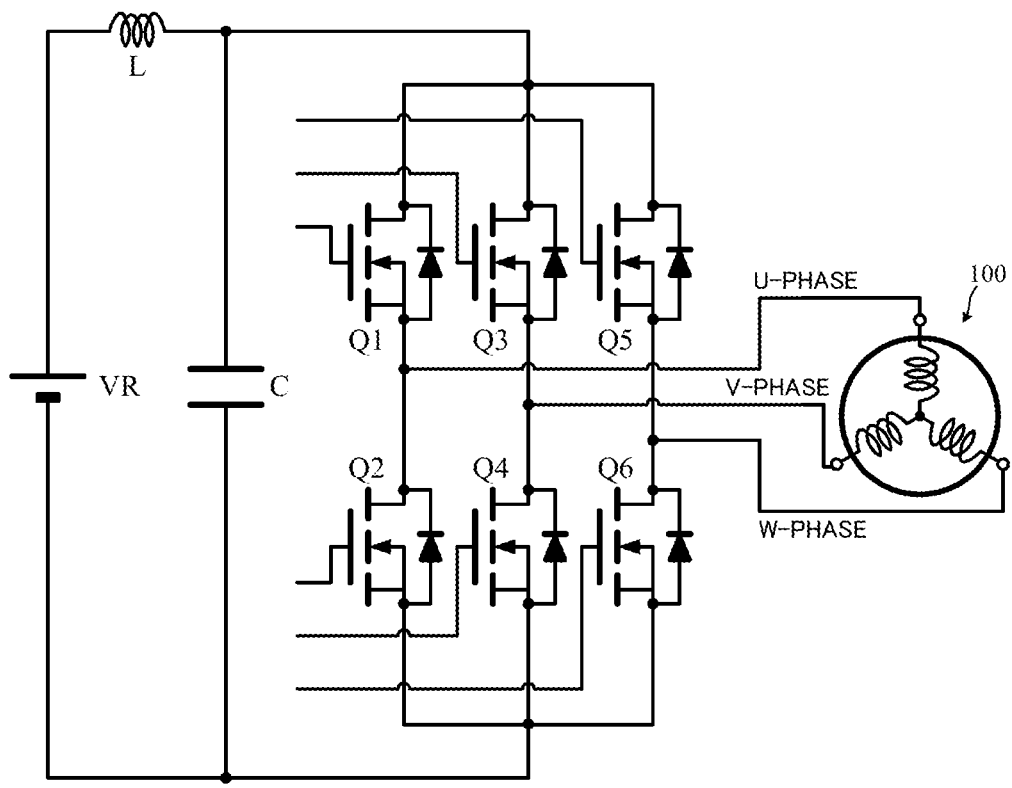
FIG. 4 is a wiring diagram showing a configuration example of a general inverter.
Figure 5:
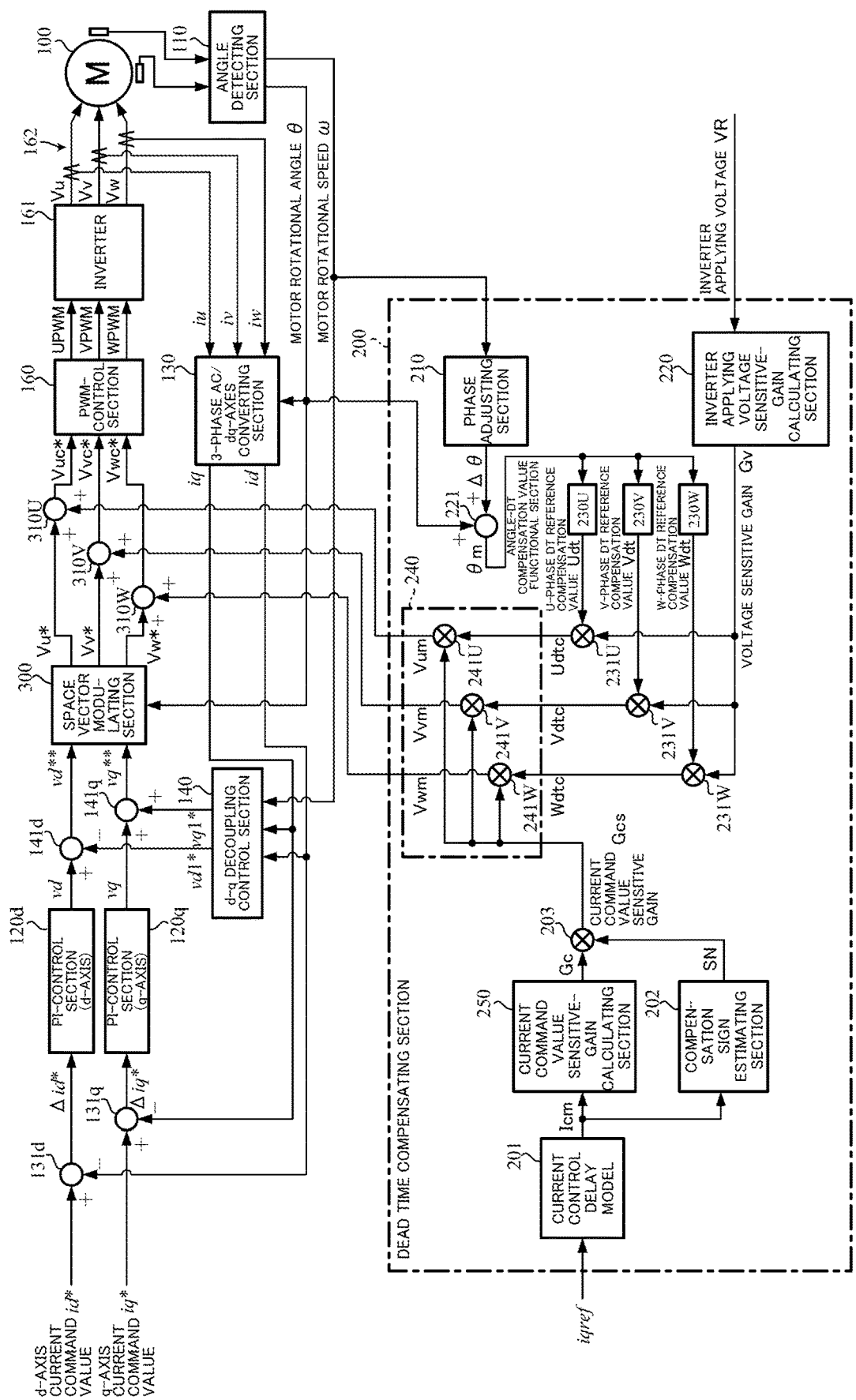
FIG. 5 is a block diagram showing a configuration example of a motor control unit on which the present invention relies.

FIG. 5 shows an overall configuration of the motor control unit corresponding to FIG. 3, and there is provided a dead time compensating section 200 to calculate 3-phase dead time compensation values $V_{um}$, $V_{vm}$ and $V_{wm}$. The q-axis steering-assist command value iqref corresponding to the steering assist command value Iref2 in FIG. 2, a motor rotational angle θ and a motor rotational speed ω are inputted into the dead time compensating section 200. PWM-signals (UPWM, VPWM, WPWM) from a PWM-control circuit (not shown) in a PWM-control section 160 are inputted into the inverter 161 and an inverter applying voltage VR applied to the inverter 161 is inputted into the dead time compensating section 200.

A d-axis current command value id* and a q-axis current command value iq* are respectively inputted into subtracting sections 131d and 131q, and current deviation Δid* between the d-axis current command value id* and the feed-back current id and current deviation Δiq* between the q-axis current command value iq* and the feed-back current iq are respectively calculated at the subtracting sections 131d and 131q. The calculated current deviation Δid* is inputted into the PI-control section 120d, and the calculated current deviation Δiq* is inputted into the PI-control section 120q. The PI-controlled d-axis voltage command value vd and q-axis voltage command value vq are inputted into a subtracting section 141d and an adding section 141q, respectively. The voltage vd1* from a d-q decoupling control section 140 is inputted into the subtracting section 141d and a d-axis voltage command value vd** which is the difference between the PI-controlled d-axis voltage command value vd and the voltage vd1* is obtained at the subtracting section 141d. The voltage vq1* from the d-q decoupling control section 140 is inputted into the adding section 141q and a q-axis voltage command value vq which is the added result is obtained at the adding section 141q. The voltage command values vd and vq** are inputted into a space vector modulating section 300 that converts from two phases of the dq axes to three phases of a U-phase, a V-phase and a W-phase and superimposes third-harmonic to the three phases. The voltage command values Vu*, Vv*, Vw* of the three phases, which are vector-modulated in the space vector modulating section 300, are respectively inputted into an adding sections 310U, 310V, 310W and then added to dead time compensation valued Vum, Vvm, Vwm from the dead time compensating section 200 described below. The voltage command values Vuc*, Vvc*, Vwc* which are added results are inputted into the PWM-control section 160. The motor 100 is driven and controlled via the PWM-control section 160 and the inverter 161 as described above.

Next, the dead time compensating section 200 will be described.

The dead time compensating section 200 comprises a current control delay model 201, a compensation sign estimating section 202, a multiplying sections 203, an adding section 221, a phase adjusting section 210, an inverter applying voltage sensitive-gain calculating section 220, angle-dead time compensation value functional sections 230U, 230V and 230W, multiplying sections 231U, 231V and 231W, a compensation value adjusting section 240 and a current command value sensitive-gain calculating section 250.

As well, a dead time compensation-value outputting section comprises the multiplying sections 231U, 231V and 231W and the compensation value adjusting section 240. A current command value sensitive-gain calculating section comprises the current control delay model 201, the compensation sign estimating section 202, the current command value sensitive-gain calculating section 250 and the multiplying section 203.

Figure 6:
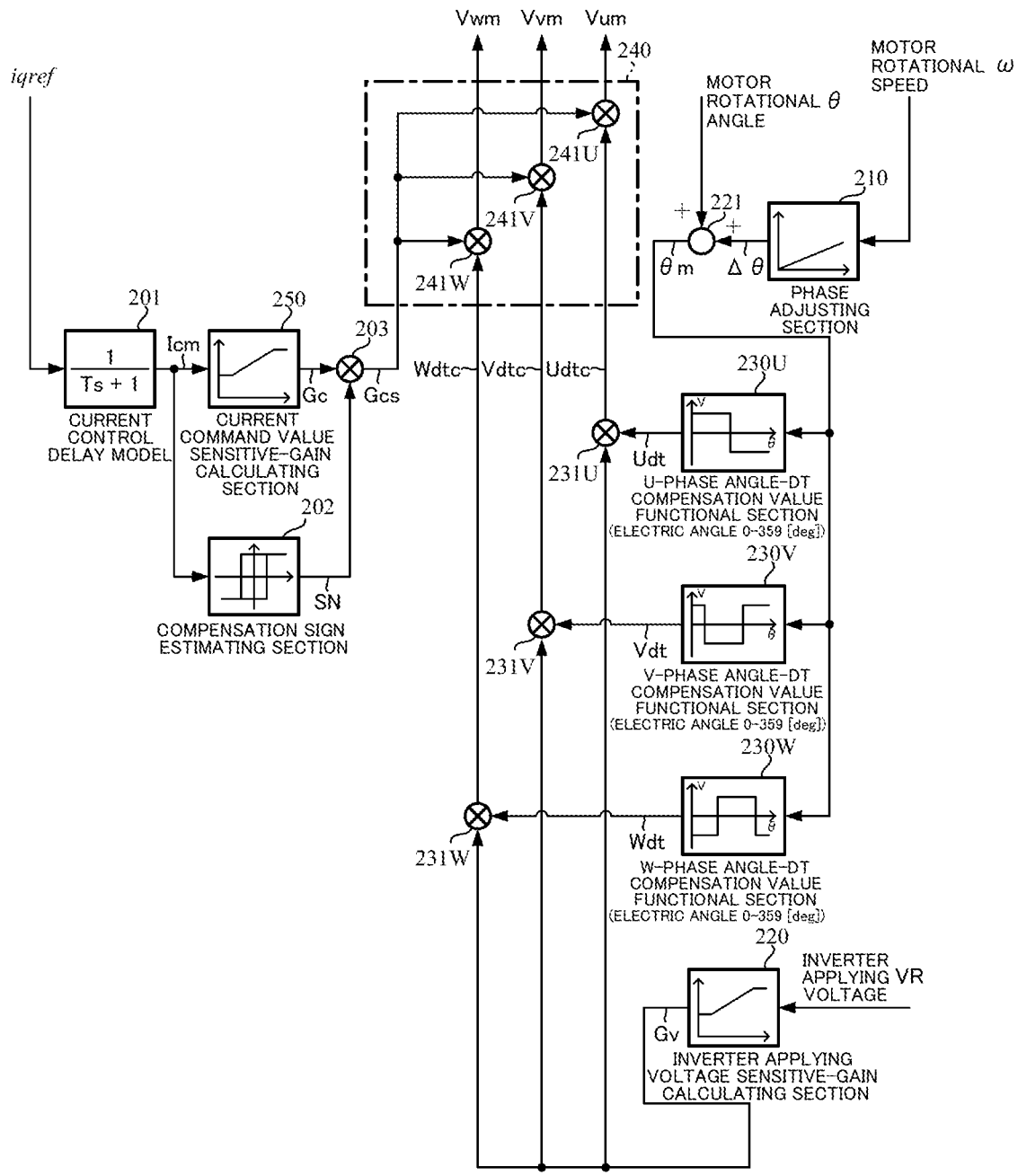
FIG. 6 is a block diagram showing a detail configuration example of a dead time compensating section.

The detail configuration of the dead time compensation 200 is shown in FIG. 6, and will be described with reference to FIG. 6.

The q-axis steering assist command value iqref is inputted into the current control delay model 201. A delay due to a noise filter or the like in the ECU is occurred until the dq-axes current command values id* and iq* are reflected in the actual currents. When the sign is directly judged from the current command value iq*, the timing deviation can be occurred. In order to resolve this problem, the present invention approximates the delay of the overall current control as a primary filter model and improves the phase difference. The current control delay model 201 is a primary filter of a following Expression 1 and "T" denotes a filter time constant. The current control delay model 201 may be a model of a secondary filter or higher order filter.

$$\frac{1}{Ts+1} \qquad \text{[Expression 1]}$$

The current command value $I_{cm}$ outputted from the current control delay model 201 is inputted into the current command value sensitive-gain calculating section 250 and the compensation sign estimating section 202. In a low current region, a case that the dead time compensation amount is overcompensated is occurred. The current command value sensitive-gain calculating section 250 has a function that a gain, which the compensation amount is reduced depending on the magnitude of the current command value $I_{cm}$ (the steering assist command value iqref), is calculated. In order that the gain, which the compensation amount is reduced, is not largely changed due to a noise from the current command value $I_{cm}$ (the steering assist command value iqref), or the like, a noise reduction process is performed by using a weighted average filter.

Figure 7:
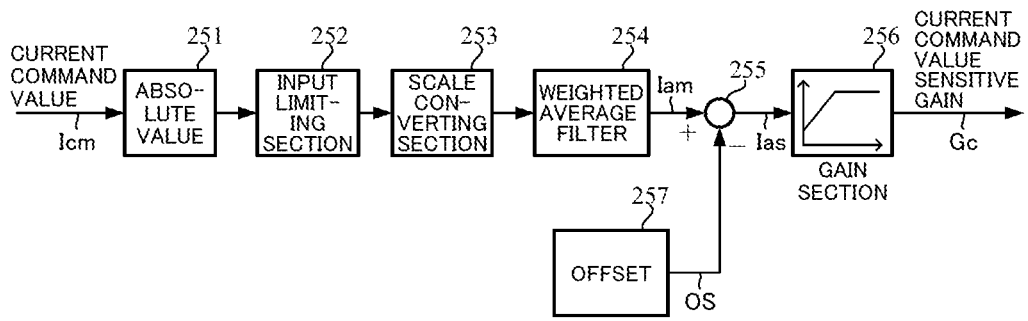
FIG. 7 is a block diagram showing a configuration example of a current command value sensitive-gain section.
Figure 8:
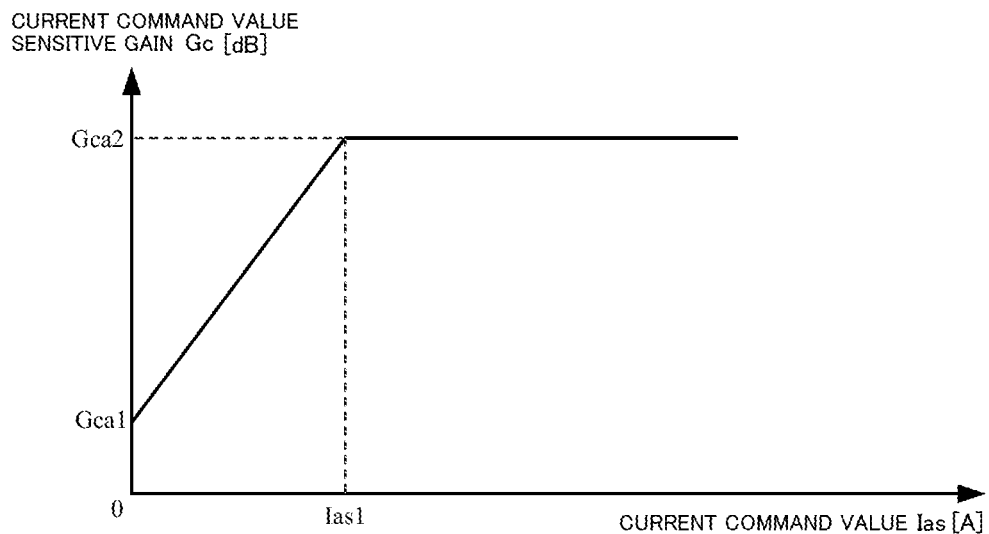
FIG. 8 is a characteristic diagram showing a gain section in the current command value sensitive-gain section.

The current command value sensitive-gain calculating section 250 has a configuration shown in FIG. 7. An absolute value of the current command value $I_{cm}$ is calculated at an absolute value section 251. The absolute value of the current command value $I_{cm}$ whose maximum value is limited at an input limiting section 252 is inputted into a weighted average filter 254 via a scale converting section 253. The current command value $I_{am}$ that the noise is reduced at the weighted average filter 254 is addition-inputted into a subtracting section 255, and a predetermined offset OS is subtracted from the current command value $I_{am}$ at the subtracting section 255. The reason for subtracting the offset OS is to prevent a chattering due to a minute current command value, and the input value that is equal to or smaller than the offset OS is fixed to the minimum gain. The offset OS is a constant value. The current command value $I_{as}$ that the offset OS is subtracted at the subtracting section 255 is inputted into a gain section 256, and the current command value sensitive gain $G_c$ is outputted in accordance with a gain characteristic as shown in FIG. 8.

Figure 9:
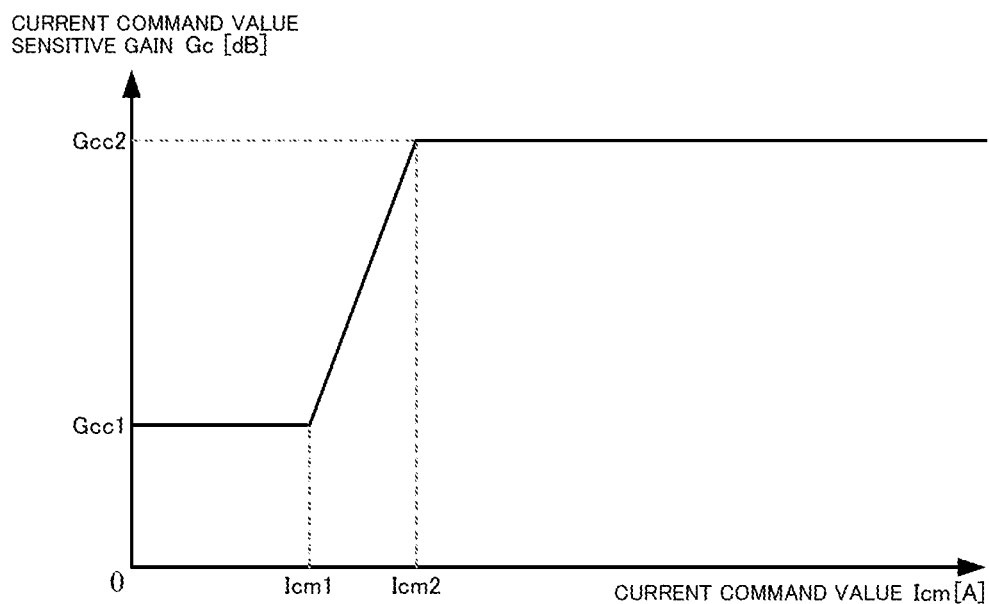
FIG. 9 is a characteristic diagram showing a characteristic example of the current command value sensitive-gain section.

The current command value sensitive gain $G_c$ outputted from the current command value sensitive-gain calculating section 250 has a characteristic, for example, as shown in FIG. 9, to the inputted current command value $I_{cm}$. That is, the current command value sensitive gain $G_c$ is a constant gain $G_{cc1}$ when the current command value $I_{cm}$ is smaller than a predetermined current $I_{cm1}$, linearly (or nonlinearly) increases when the current command value $I_{cm}$ is equal to or larger than the predetermined current $I_{cm1}$ and is smaller than a predetermined current $I_{cm2}$ ($>I_{cm1}$), and holds a constant gain $G_{cc2}$ when the current command value $I_{cm}$ is equal to or larger than the predetermined current $I_{cm2}$. The predetermined current $I_{cm1}$ may be zero.

Figure 10A:
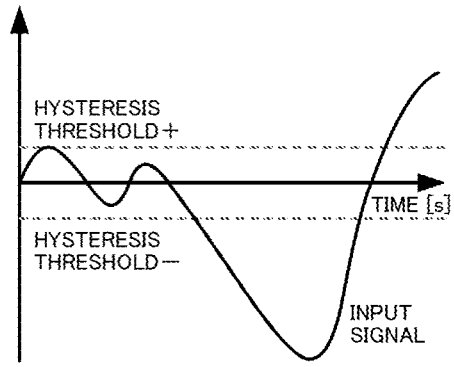
FIGS. 10A and 10B are waveform charts showing an operation example of a compensation sign estimating section.
Figure 10B:
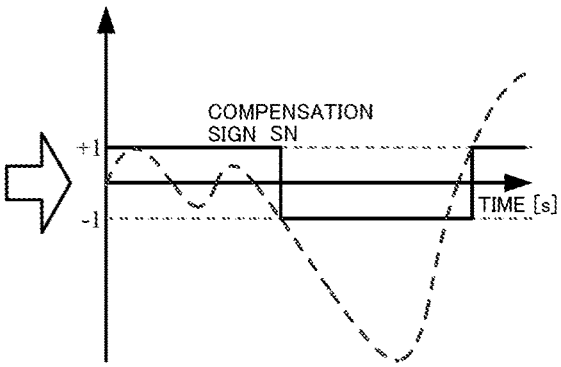

The compensation sign estimating section 202 outputs a compensation sign SN, which has a positive value (+1) or a negative value (−1) and indicates a hysteresis characteristic shown in FIGS. 10A and 10B, against the inputted current command value $I_{cm}$. The compensation sign SN is estimated based on zero-crossing points of the current command value $I_{cm}$ as a reference. In order to suppress the chattering, the compensation sign SN has the hysteresis characteristic. The estimated compensation sign SN is inputted into the multiplying section 203. The positive and negative thresholds of the hysteresis characteristic are appropriately changeable.

The current command value sensitive gain $G_c$ from the current command value sensitive-gain calculating section 250 is inputted into the multiplying section 203. The multiplying section 203 outputs the current command value sensitive gain $G_{cs}$ ($=G_c \times SN$) that the current command value sensitive gain $G_c$ is multiplied by the compensation sign SN. The current command value sensitive gain $G_{cs}$ is inputted into the multiplying sections 241U, 241V and 241W in the compensation value adjusting section 240.

Figure 11:
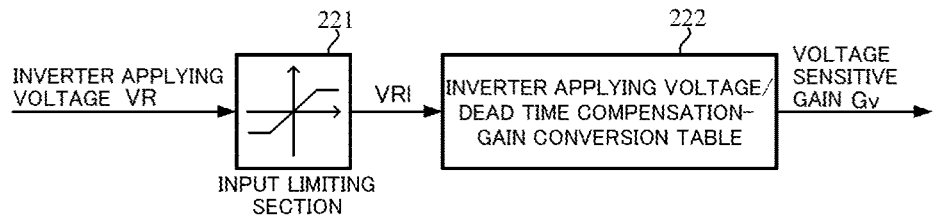
FIG. 11 is a block diagram showing a configuration example of an inverter applying voltage sensitive-gain section.
Figure 12:
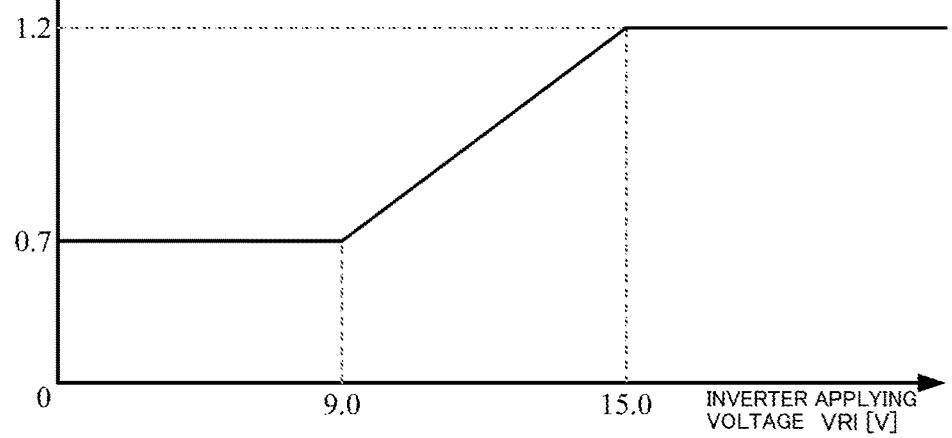
FIG. 12 is a characteristic diagram showing a characteristic example of the inverter applying voltage sensitive-gain section.

Since the optimal dead time compensation amount varies depending on the inverter applying voltage VR, the present example calculates the dead time compensation amount depending on the inverter applying voltage VR and changes the dead time compensation amount. The configuration of the inverter applying voltage sensitive-gain calculating section 220 to output the voltage sensitive gain $G_v$ by inputting the inverter applying voltage VR is shown in FIG. 11. An absolute value of the maximum value of the inverter applying voltage VR is limited in an input limiting section 221 and the limited inverter applying voltage VRI is inputted into an inverter applying voltage/dead time compensation-gain conversion table 222. The characteristic of the inverter applying voltage/dead time compensation-gain conversion table 222 is shown, for example, in FIG. 12. The inverter applying voltages 9.0[V] and 15.0[V] of inflection points and the voltage sensitive gains "0.7" and "1.2" are presented as examples and are appropriately changeable. The voltage sensitive gain $G_v$ is inputted into the multiplying sections 231U, 231V and 231W.

Figure 13:
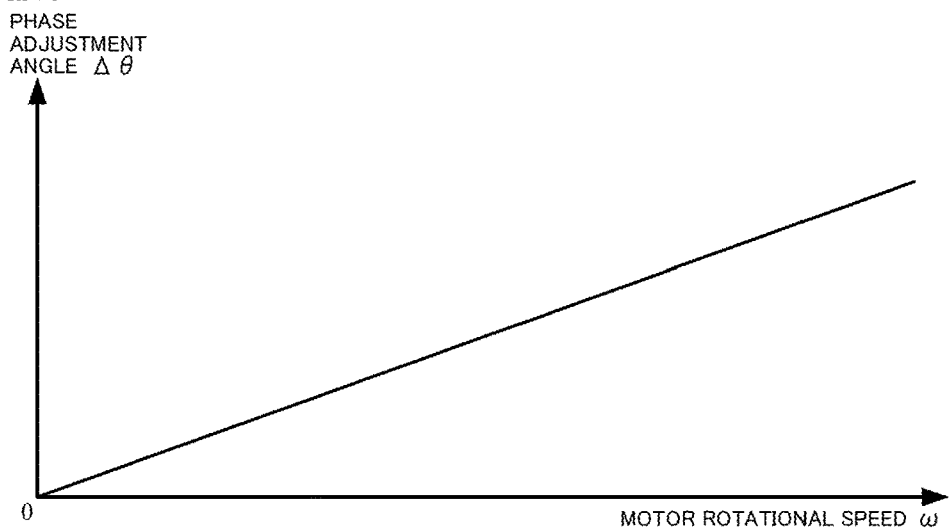
FIG. 13 is a characteristic diagram showing a characteristic example of a phase adjusting section.

In a case that the dead time compensation timing is hastened or is delayed in response to the motor rotational speed ω, the phase adjusting section 210 has a function to calculate the adjustment angle depending on the motor rotational speed ω. The phase adjusting section 210 has a characteristic as shown in FIG. 13 in a case of a lead angle control. The calculated phase adjustment angle Δθ is inputted into the adding section 221 and is added to the detected motor rotational angle θ. The motor rotational angle $θ_m$ (=θ+Δθ) that is an added result of the adding section 221 is inputted into the angle-dead time compensation value functional sections 230U, 230V and 230W.

Figure 14:
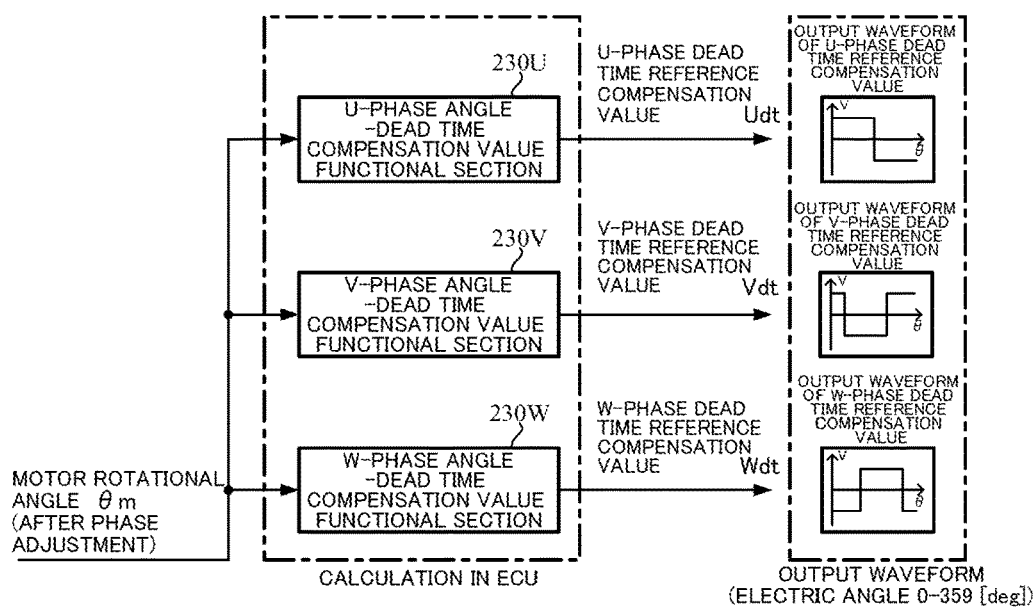
FIG. 14 is a diagram showing an operation example of a respective angle-dead time compensation value functional section.

The angle-dead time compensation value functional sections 230U, 230V and 230W, as shown in FIG. 14 in detail, respectively output respective phase rectangular wave dead time reference compensation values Udt, Vdt and Wdt whose phases are shifted each other by 120 [deg] in a range of 0 to 359 [deg] in the electric angle, to the phase-adjusted motor rotational angle $\theta_m$. The angle-dead time compensation value functional sections 230U, 230V and 230W treat the dead time compensation values, which are needed in the 3-phases, as functions depending on the angle, calculate the dead time compensation values in the real time of the ECU, and output the 3-phase dead time reference compensation values Udt, Vdt and Wdt. The angle functions of the dead time reference compensation values are different depending on the characteristic of the dead time in the ECU.

The dead time reference compensation values Udt, Vdt and Wdt are respectively inputted into multiplying sections 231U, 231V and 231W, and are multiplied by the voltage sensitive gain $G_v$. The 3-phase dead time compensation values Udtc ($=G_v \cdot$Udt), Vdtc ($=G_v \cdot$Vdt) and Wdtc ($=G_v \cdot$Wdt) which are multiplied by the voltage sensitive gain $G_v$ are inputted into the multiplying sections 241U, 241V and 241W in the compensation value adjusting section 240, respectively. The current command value sensitive gain $G_{cs}$ is also inputted into the multiplying sections 241U, 241V and 241W and the multiplied results are outputted as the dead time compensation values Vum, Vvm and Vwm from the multiplying sections 241U, 241V and 241W, respectively. The dead time compensation values Vum, Vvm and Vwm are added to the 3-phase space vector-modulated voltage command values Vu*, Vv* and Vw* at the adding sections 310U, 310V and 310W, respectively. The voltage command values Vuc*, Vvc* and Vwc* which are the added results are inputted into the PWM-control section 160.

The dead time compensation values are the 3-phase functions depending on the motor rotational angle (the electrical angle), and the control unit (ECU) has a configuration that the feed-forward compensation is performed to the 3-phase voltage command values. The dq-axes steering assist command values are used in the compensation sign of the dead time. The compensation amount is variable so that the magnitude of the compensation amount is optimal depending on the magnitude of the steering assist command value and the magnitude of the inverter applying voltage VR.

Figure 15:
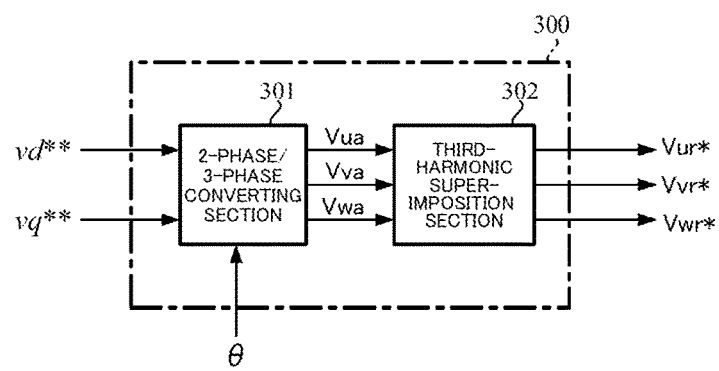
FIG. 15 is a block diagram showing a configuration example of a space vector modulating section.

Next, the space vector modulation will be described. As shown in FIG. 15, the space vector modulating section 300 may have a function that converts the 2-phase voltages vd and vq on the dq-axes space into the 3-phase voltages Vua, Vva and Vwa, and superimposes the third-harmonic on the 3-phase voltages Vua, Vva and Vwa. For example, the method of the space vector modulation that the applicant proposes in Japanese Unexamined Patent Publication No. 2017-70066, WO/2017/098840 and the like may be used.

Figure 16:
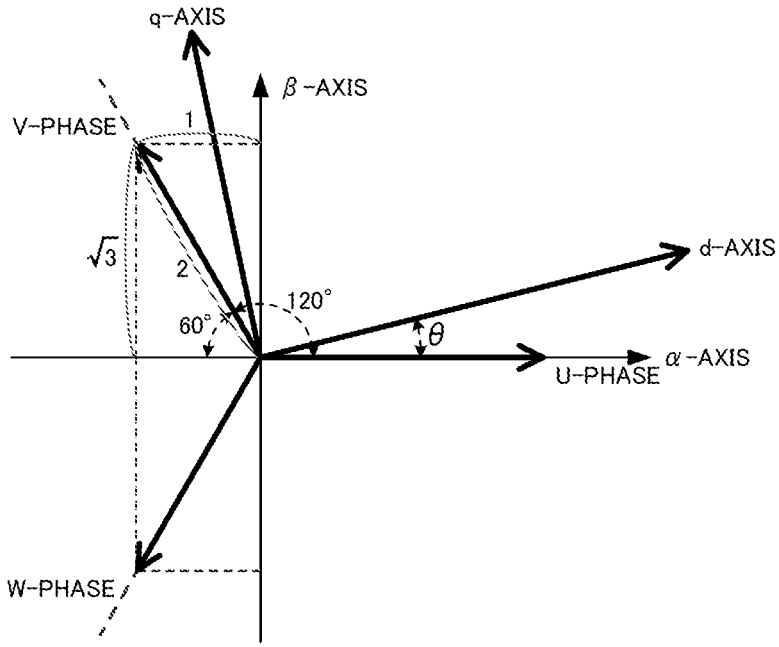
FIG. 16 is a diagram showing an operation example of the space vector modulating section.

That is, the space vector modulation has a function that performs a following coordinate transformation based on the voltage command values vd and vq on the dq-axes space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the FETs (the upper-arm Q1, Q3 and Q5, and the lower-arm Q2, Q4 and Q6) of the inverter with the bridge configuration. With reference to the coordinate transformation, in the space vector modulation, the coordinate transformation to the voltage vectors Vα and Vβ in the α-β coordinate system based on an Expression 2 is performed to the voltage command values vd and vq. A relationship between the coordinate axes that are used in this coordinate transformation and the motor rotational angle θ are shown in FIG. 16.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \qquad \text{[Expression 2]}$$

A relationship shown in an Expression 3 between a target voltage vector in the d-q coordinate system and a target voltage vector in the α-β coordinate system is existed. The absolute value of the target voltage vector V is conserved.

$$|V| = \sqrt{(v_d^{})^2 + (v_q^{})^2} = \sqrt{V\alpha^2 + V\beta^2} \qquad \text{[Expression 3]}$$

Figure 17:
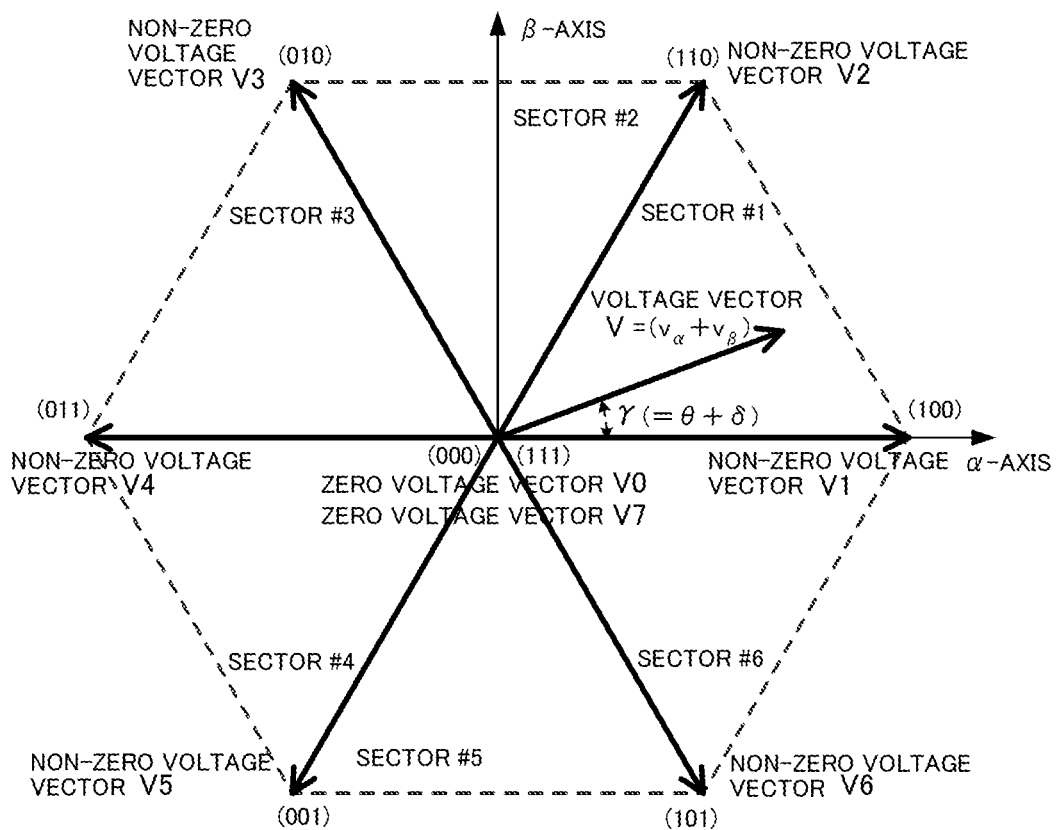
FIG. 17 is a diagram showing an operation example of the space vector modulating section.

In the switching pattern of the space vector control, the output voltage is defined by using eight discrete reference voltage vectors V0 to V7 (non-zero voltage vectors V1 to V6 that the phase differs every π/3 [rad] and zero voltage vectors V0 and V7) that are shown in the space vector diagram of FIG. 17, depending on the switching patterns S1 to S6 of the FETs (Q1 to Q6). The selection of these reference output voltage vectors V0 to V7 and the occurring time are controlled. By using six regions sandwiched between adjacent reference output voltage vectors, the space vector can be divided into the six sectors #1 to #6, and the target voltage vector V is belong to any one of the sectors #1 to #6, and can be assigned to the sector number. The target voltage vector V is a synthetic vector of Vα and Vβ and there are six sectors in a regular hexagon on the α-β space, as shown in FIG. 17. Which sector that the target voltage vector V exists can be determined based on the rotational angle γ in the α-β coordinate system of the target voltage vector V. The rotational angle γ is determined by a sum of the rotational angle θ of the motor and a phase δ obtained from the relationship of the voltage command values vd and vq in the d-q coordinate system (γ=θ+δ).

Figure 18:
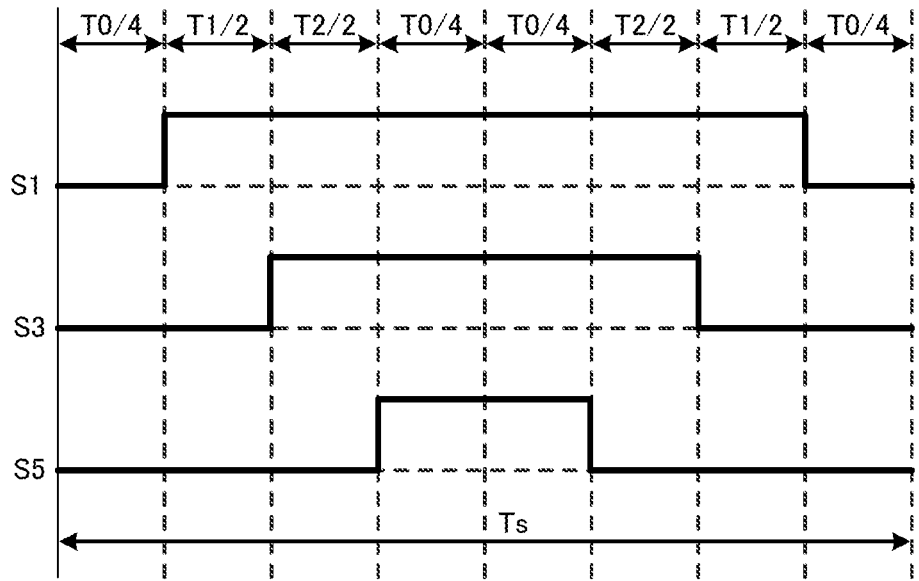
FIG. 18 is a timing chart showing an operation example of the space vector modulating section.

FIG. 18 shows a basic timing chart that the switching pulse width and the timing in the turning-ON/turning-OFF signals S1 to S6 (switching patterns) to the FETs are determined in order to output the target voltage vector V from the inverter by a digital control by means of the switching patterns S1, S3 and S5 of the inverter in the space vector control. The space vector modulation performs the calculation and the like in every defined sampling period Ts, and outputs the respective pulse widths and the timings in the switching patterns S1 to S6 to which the calculation result is transformed in the next sampling period Ts.

The space vector modulation generates the switching patterns S1 to S6 depending on the sector number that is obtained based on the target voltage vector V. In FIG. 18, in a case of the sector number #1 (n=1), one example of the switching patterns S1 to S6 of the inverter is shown. The signals S1, S3 and S5 show the gate signals of the switching devices Q1, Q3 and Q5 that are corresponding to the upper-arm. The horizontal axis denotes a time, and "Ts" is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

In a case that the space vector modulation is not performed, the dead time compensation of the present example is applied on the dq-axes, and the dead time compensation value waveform (the U-phase waveform) that the dq-axes/

Figure 19:
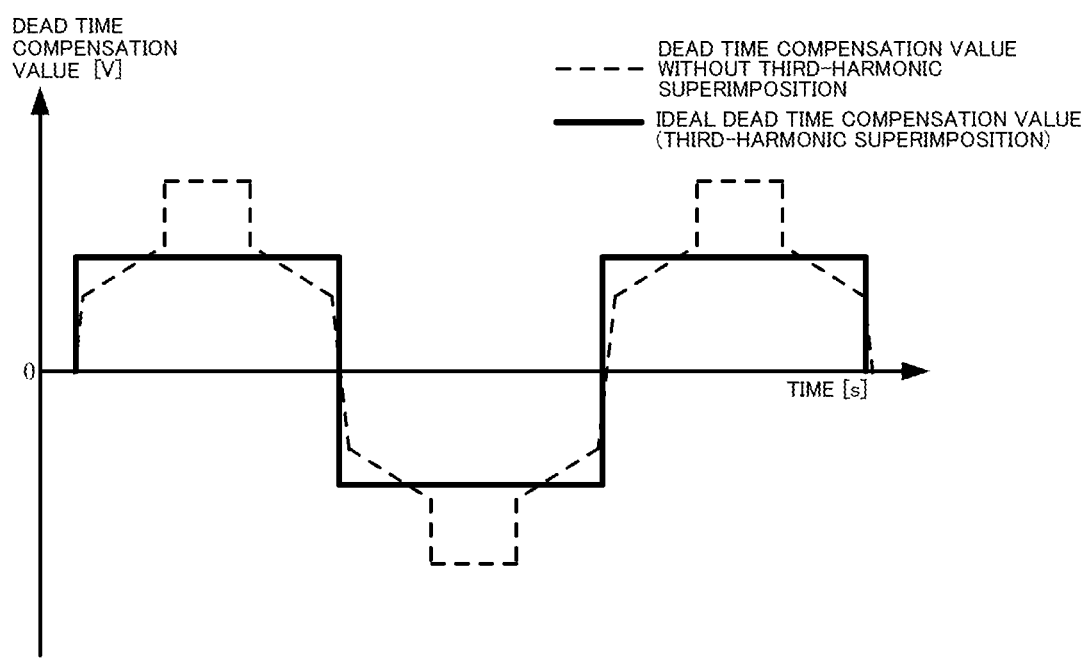
FIG. 19 is a waveform chart showing an effect of the space vector modulating section.

3-phase converting is performed to only the dead time compensation value is shown in a waveform represented by a dashed line of FIG. 19 that the third-order component is removed. The same phenomena are exhibited in the V-phase and the W-phase. By applying the space vector modulation instead of the dq-axes/3-phase converting, the third-harmonic can be superimposed on the 3-phase signals, the third-order component that is removed by the 3-phase converting can be compensated, and the ideal dead time compensation waveform that is shown in a solid line of FIG. 19 can be generated.

Figure 20:
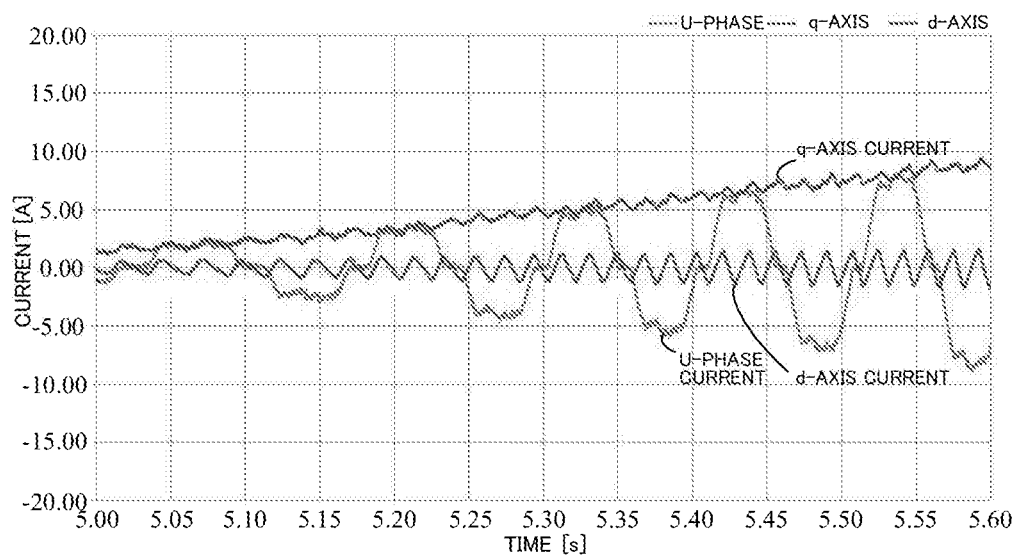
FIG. 20 is a waveform chart showing an effect of the dead time compensation (without the dead time compensation)
Figure 21:
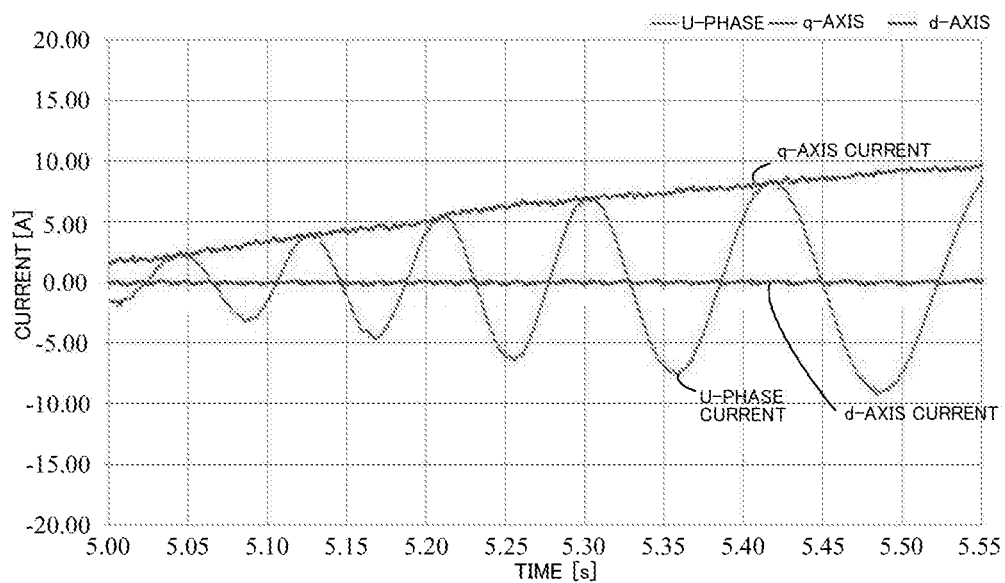
FIG. 21 is a waveform chart showing an effect of the dead time compensation (with the dead time compensation)

FIGS. 20 and 21 are simulation results showing effects of the present example. FIG. 20 shows the U-phase current, the d-axis current and the q-axis current in a case of "without the dead time compensation". By applying the dead time compensation of the present example, in the low speed and middle speed steering states, the improvements in the waveform distortion of the phase currents and the dq-axes currents as shown in FIG. 21 (the ripple is reduced in the dq-axes current waveforms and the phase currents whose waveforms are almost sinusoidal are obtained) can be confirmed. The torque ripple in the steering and the steering sound are improved.

FIGS. 20 and 21 typically show the U-phase current.

The power devices such as the FETs generate the heat by the turned-ON operation and the characteristic of the power devices is varied depending on the temperature. Thus, it is necessary that the dead time is corrected depending on the temperature of the power devices. In the present invention, the temperature of the control section (the inverter or neighborhood of the inverter) on which the power devices such as the FETs are mounted is measured, the dead time compensation value is corrected depending on the measured temperature and then the dead time of the inverter is more accurately compensated.

Figure 22:
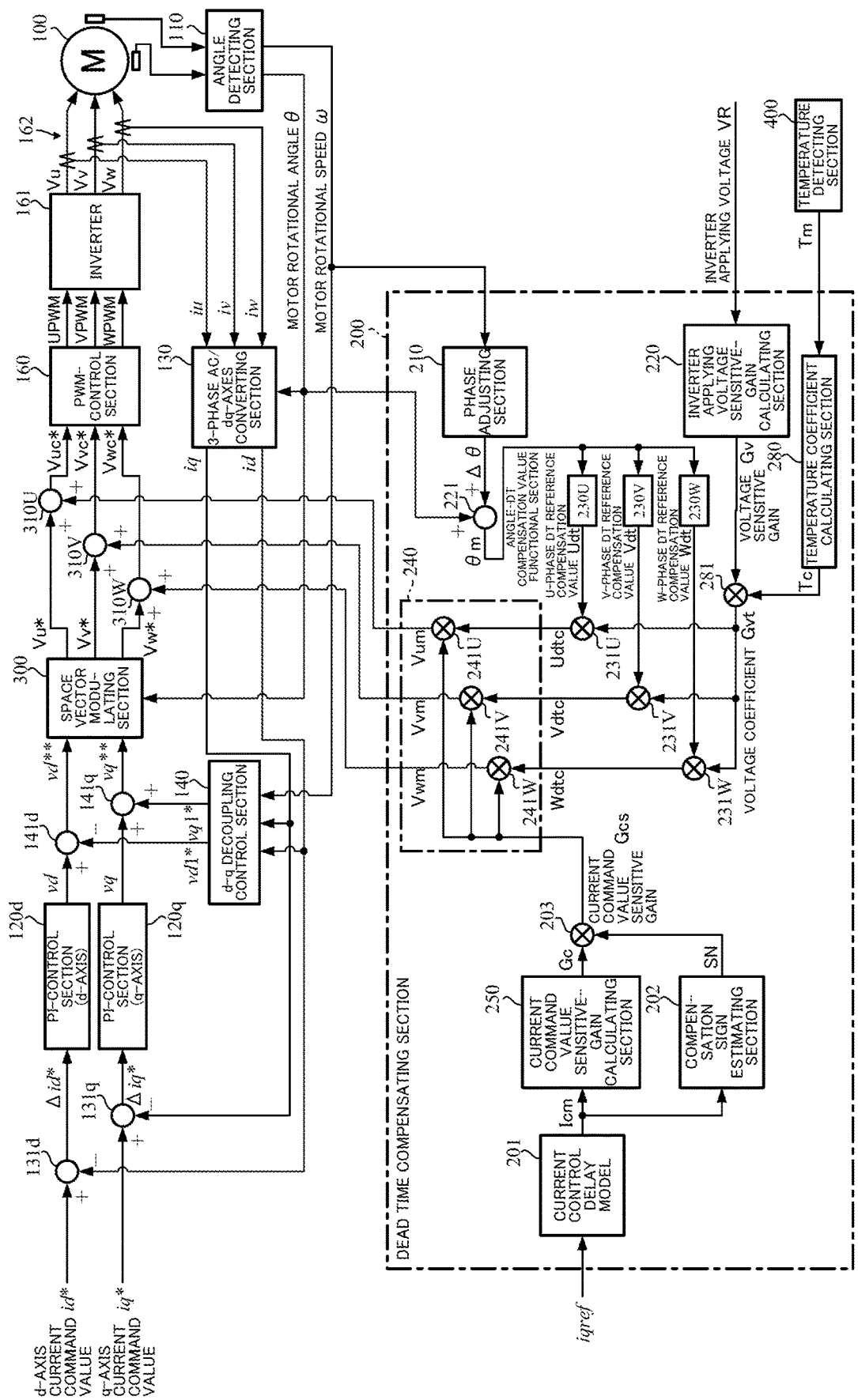
FIG. 22 is a block diagram showing a configuration example (the first embodiment) of the motor control unit of the present invention.

FIG. 22 shows the first embodiment of the present invention corresponding to FIG. 5. Compared with FIG. 5, a temperature detecting section 400, a temperature coefficient calculating section 280 and a multiplying section 281 are added. Because the configurations and the operations of other sections are the same as those of the example in FIG. 5, the explanation of other sections is omitted.

Figure 23:
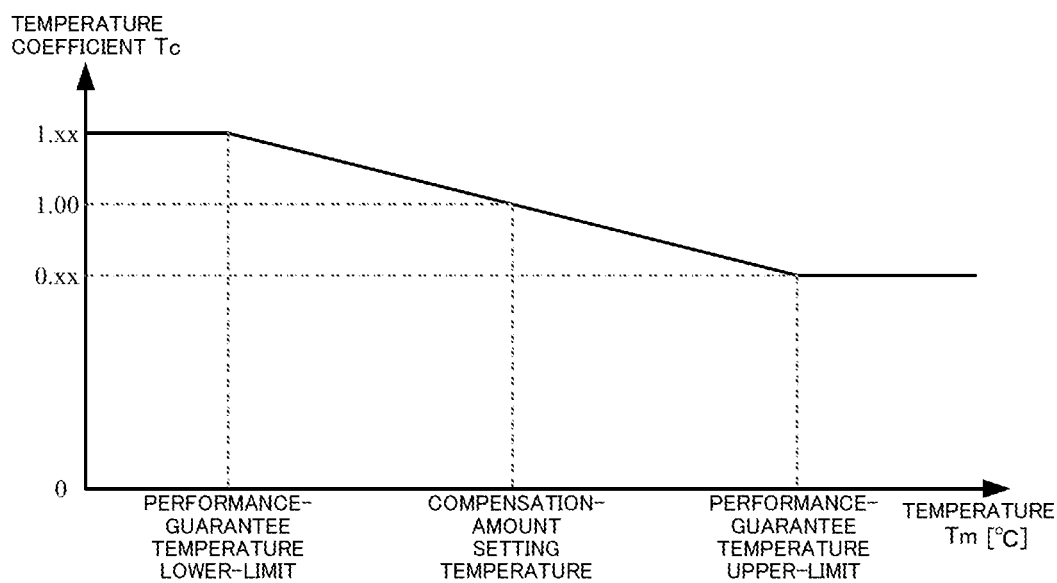
FIG. 23 is a characteristic diagram showing a characteristic example of a temperature coefficient calculating section.

The temperature detecting section 400 detects (or estimates) the temperature of the power devices in the control section (the ECU in the EPS) or the temperature of neighborhood of the power devices in the control section by using the known method, and inputs the detected temperature Tm into the temperature coefficient calculating section 280 in the dead time compensating section 200. In a case that the dead time compensation is performed by the feed-forward control, the compensation amount is set to a value which is consistent with an amount in which the dead band characteristic of the duty command value due to the dead time of the control section at the room temperature is compensated. However, when the temperature of the control section becomes higher, since the actually required dead time (hereinafter referred to as "the actual dead time") becomes short and the dead band which is needed in the duty command value is also small, the torque ripple due to excessive compensation amount can be generated. In a case that the outside air temperature is low, since the temperature of the control section becomes low, the actual dead time is longer than that at the room temperature and the dead band which is needed in the duty command value is also large, the torque ripple due to the shortage of the compensation amount can be generated. Accordingly, in order to prevent from the excessive compensation amount at the high temperature and the shortage of the compensation amount at the low temperature, the compensation amount is set to be variable depending on the temperature of the control section or the temperature of neighborhood of the control section, by using the temperature coefficient Tc calculated at the temperature coefficient calculating section 280. As shown in FIG. 23, the temperature coefficient calculating section 280 measures the required compensation amounts at the three points that are a compensation-amount setting temperature, a performance-guarantee temperature upper-limit and a performance-guarantee temperature lower-limit. Setting the value at the compensation-amount setting temperature as a reference value "1.00", the temperature coefficient Tc is obtained by calculating a ratio of a value at the performance-guarantee temperature lower-limit to a value at the compensation-amount setting temperature and a ratio of a value at the performance-guarantee temperature upper-limit to a value at the compensation-amount setting temperature. A ratio between the above three points is generated by a linear interpolation calculation or using the table to the temperature Tm, and the limits to the performance-guarantee temperature upper-limit and the performance-guarantee temperature lower-limit may be set. In a case that the temperature characteristic of the control section is complicate, the number of the contact points (the number of the measurement points) may increase and the curve interpolation table may be used. As a characteristic example of the temperature coefficient Tc, the compensation-amount setting temperature, the guarantee-temperature lower-limit and the performance-guarantee temperature upper-limit are set to be 20 degrees Celsius, −40 degrees Celsius and 80 degrees Celsius, respectively. Assuming that the required compensation amount at −40 degrees Celsius is increased by 10% to the required compensation amount at 20 degrees Celsius and the required compensation amount at 80 degrees Celsius is decreased by 10% to the required compensation amount at 20 degrees Celsius, the characteristic table of the temperature coefficient Tc is shown in FIG. 24.

The temperature coefficient Tc from the temperature coefficient calculating section 280 is inputted into the multiplying section 281 and is multiplied and the voltage sensitive gain $G_v$ together, and a voltage coefficient $G_{vt}$ which is corrected by the temperature coefficient Tc is inputted into the multiplying sections 231U, 231V and 231W. The following operations are the same as those of the example of FIG. 5.

Figure 24:
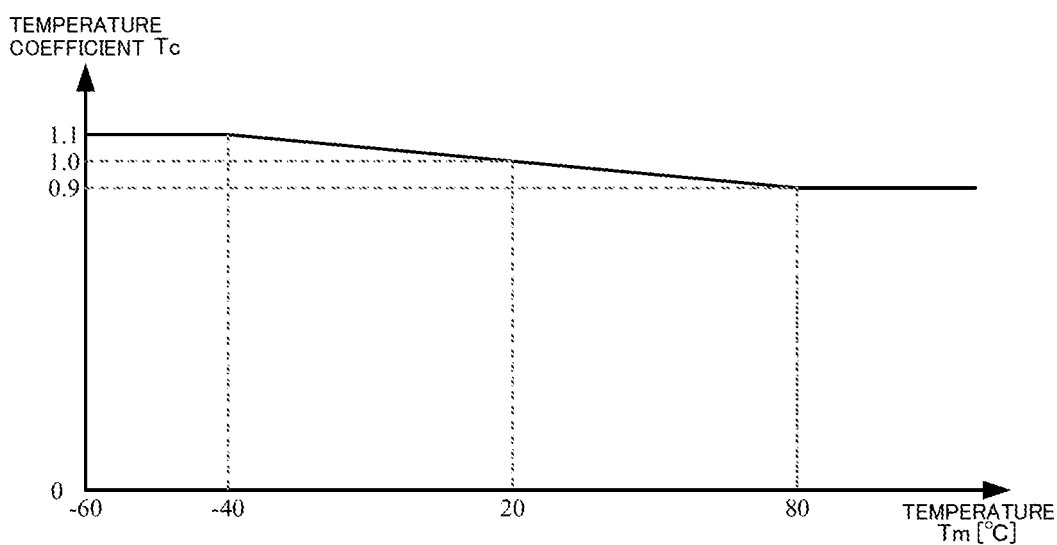
FIG. 24 is a characteristic diagram showing a setting example of a temperature coefficient.
Figure 25A:
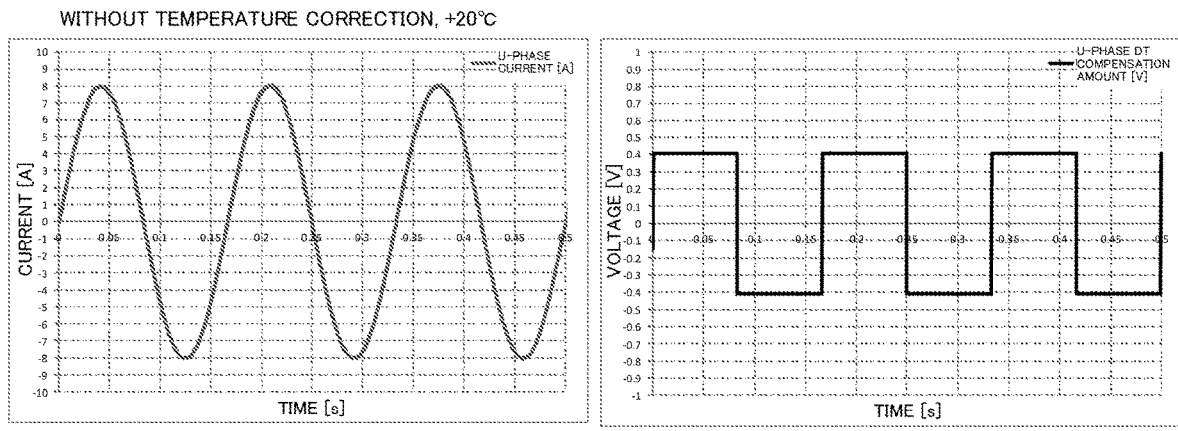
FIGS. 25A, 25B and 25C are waveform charts showing an effect of temperature correction of the present invention (the first embodiment) (without the temperature correction)
Figure 25B:
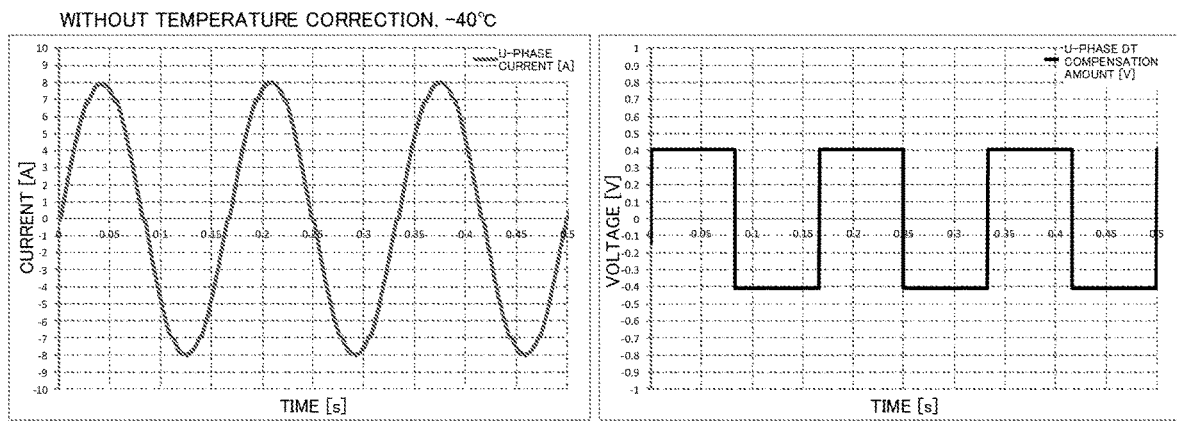
Figure 25C:
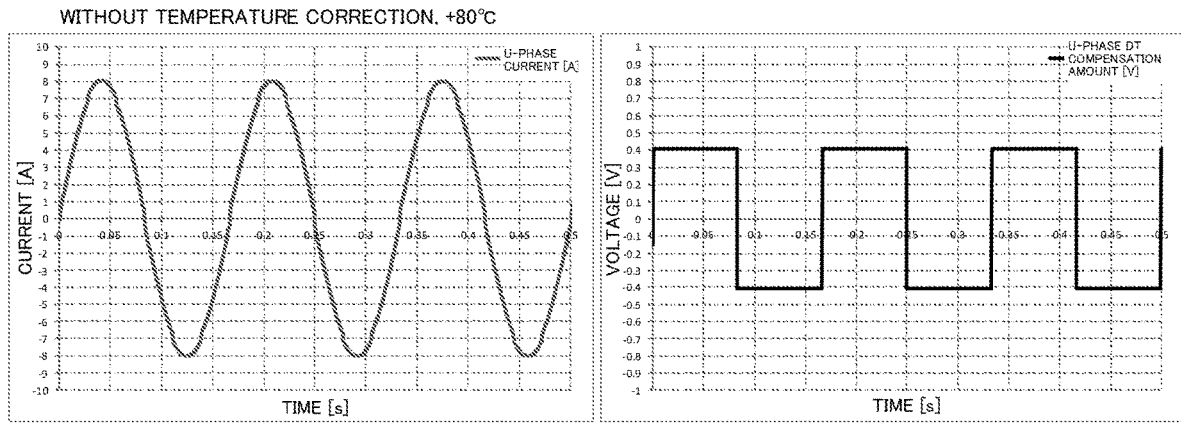
Figure 26A:
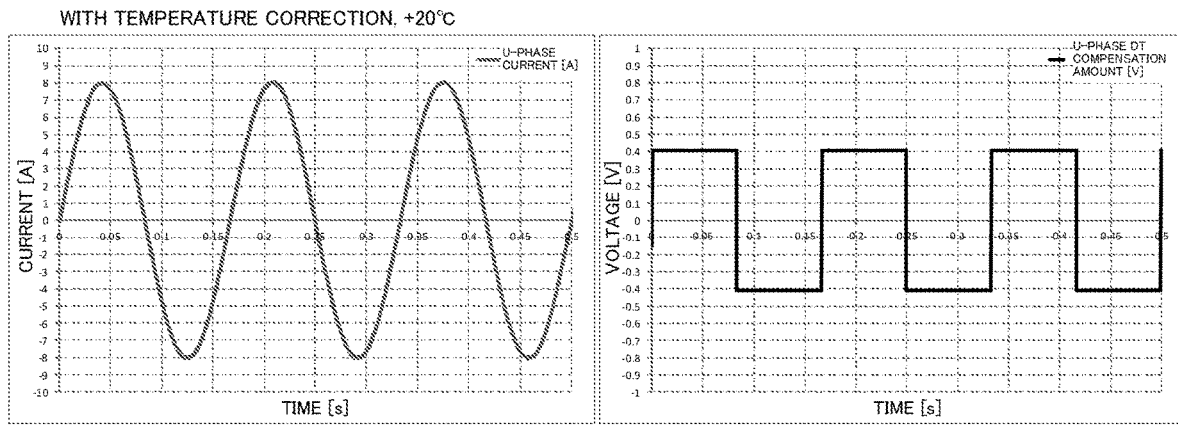
FIGS. 26A, 26B and 26C are waveform charts showing an effect of the temperature correction of the present invention (the first embodiment) (with the temperature correction)
Figure 26B:
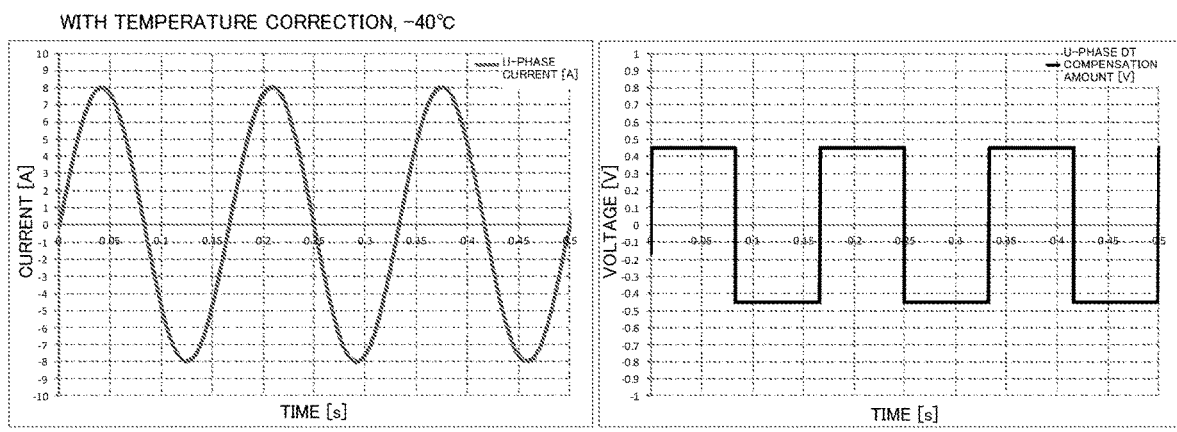
Figure 26C:
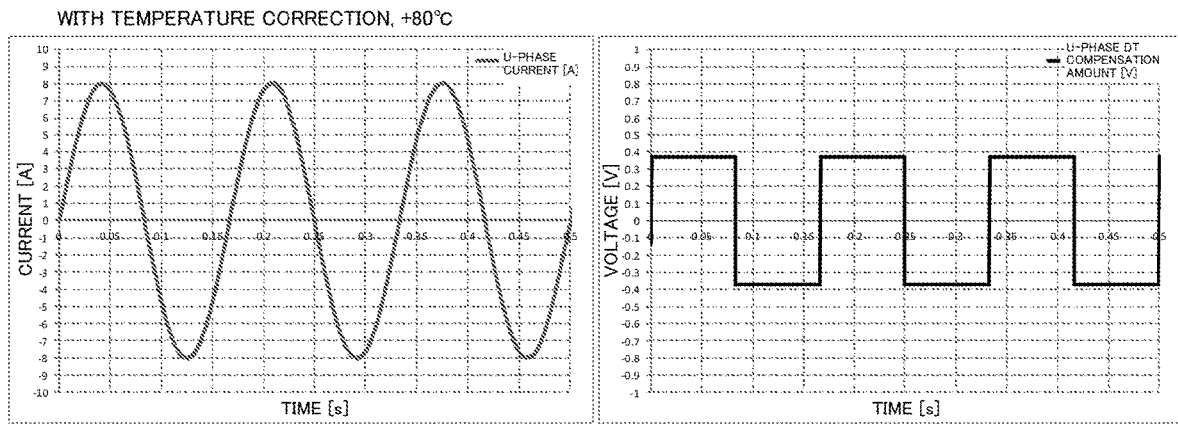

In the low load and the low speed steering condition (the motor applying voltage=12[V], Iq=8 [A], Id=0 [A] and the motor rotational speed=120 [rpm]), simulation results of "with the temperature correction" and "without the temperature correction" in a case that the temperature characteristic of the control section is shown in FIG. 24 are shown in FIGS. 25A, 25B, 25C, 26A, 26B and 26C. FIGS. 25A, 25B and 25C show the results of "without the temperature correction", FIGS. 26A, 26B and 26C show the results of "with the temperature correction", a time variation of the U-phase current is shown in the left side of the respective figures and a time variation of the U-phase dead time compensation value is shown in the right side of the respective figures. As shown in FIGS. 25A, 25B and 25C, because the compensation amount is appropriate in the 20 degrees Celsius temperature condition, the distortion of the U-phase current waveform due to the dead time is not existed (refer to FIG. 25A). Because of the shortage of the compensation amount in the −40 degrees Celsius temperature condition, the concave distortions are existed near 0 [A] of the U-phase current (refer to FIG. 25B). Because of the excessive compensation amount in the 80 degrees Celsius temperature condition, the convex distortions are existed near 0 [A] of the U-phase current (refer to FIG. 25C).

In contrast, as shown in FIGS. 26A, 26B and 26C, the temperature correction of the present embodiment is adapted in the respective temperature conditions. Since the compensation amount is ±0.41[V] and is appropriate in the 20 degrees Celsius temperature condition, the U-phase current waveform after performing the temperature-corrected dead time compensation as well as the U-phase current waveform before performing the temperature-corrected dead time compensation is not distorted (refer to FIG. 26A). Since the compensation amount is corrected to ±0.45[V] in the −40 degrees Celsius temperature condition, the concave distortions near 0 [A] of the U-phase current which is generated by the shortage of the compensation amount are improved (refer to FIG. 26B). Since the compensation amount is corrected to ±0.37[V] in the 80 degrees Celsius temperature condition, the convex distortions near 0 [A] of the U-phase current which is generated by the excessive compensation amount are improved (refer to FIG. 26C). In FIGS. 25A, 25B, 25C, 26A, 26B and 26C, only the U-phase current waveform is depicted, and the same improvement is confirmed in the V-phase and W-phase current waveforms.

In the above first embodiment, the 3-phase dead time compensation values Vum, Vvm and Vwm are added to the 3-phase space vector-modulated voltage command values Vu*, Vv* and Vw*, respectively. The dead time compensation can be performed by adding the dq-axes dead time compensation values to the voltage command values on the dq-axes (the second embodiment).

Figure 27:
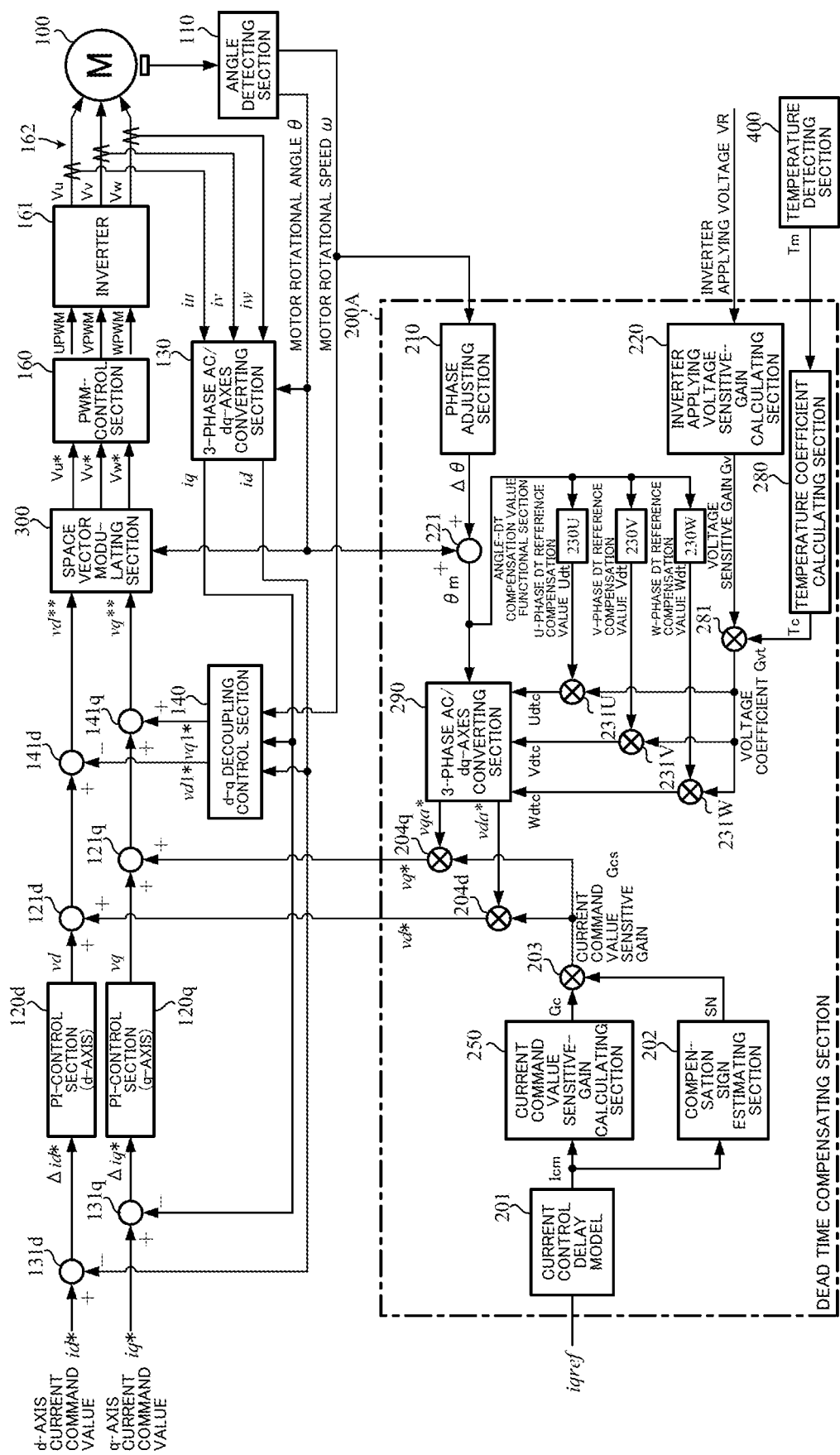
FIG. 27 is a block diagram showing a configuration example (the second embodiment) of the motor control unit of the present invention.
Figure 28:
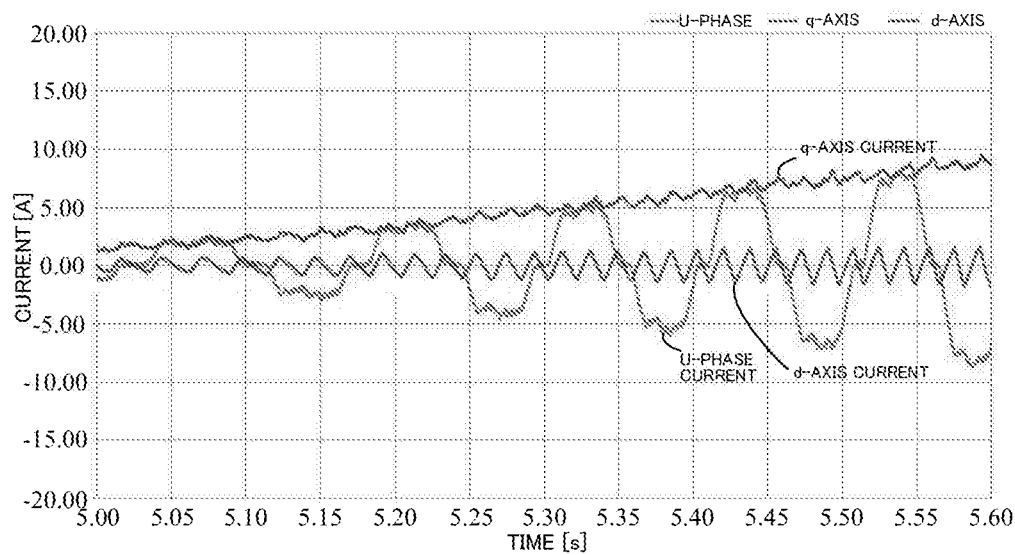
FIG. 28 is a block diagram showing a detail configuration example of the dead time compensating section.

FIG. 27 shows the second embodiment of the present invention corresponding to FIG. 22. Compared with FIG. 22, a 3-phase AC/dq-axes converting section 290, multiplying sections 204d and 204q and adding sections 121d and 121q on the voltage command paths of the dq-axes are disposed. The dq-axes dead time compensation values vd* and vq* obtained at the multiplying sections 204d and 204q are added to the voltage command values vd and vq at the adding sections 121d and 121q, respectively, and then the voltage command values vd and vq are compensated.

In the dead time compensating section 200A of the second embodiment shown in FIG. 27, the dead time reference compensation values Udt, Vdt and Wdt are respectively inputted into the multiplying section 231U, 231V and 231W, and are multiplied by the voltage coefficient $G_{vt}$ from the multiplying section 281. The 3-phase dead time compensation values Udtc (=$G_{vt}$·Udt), Vdtc (=$G_{vt}$·Vdt) and Wdtc (=$G_{vt}$·Wdt) which are multiplied by the voltage sensitive gain $G_{vt}$ and are corrected, are inputted into the 3-phase AC/dq-axes converting section 290. The 3-phase AC/dq-axes converting section 290 converts the 3-phase dead time compensation values Udtc, Vdtc and Wdtc into the dq-axes dead time compensation values vda* and vqa* in synchronized with the motor rotational angle $\theta_m$. The dead time compensation values vda* and vqa* are respectively inputted into the multiplying sections 204d and 204q and are multiplied by the current command value sensitive gain $G_{cs}$. The multiplied results at the multiplying sections 204d and 204q are the dead time compensation values vd* and vq*, and the dead time compensation values vd* and vq* are respectively inputted into the adding sections 121d and 121q, are added to the voltage command values vd and vq and the added results are inputted into the space vector modulating section 300 as the voltage command values vd and vq.

In the second embodiment, the configuration that the dead time compensation values are treated as the 3-phase function depending on the motor rotational angle (the electric angle), the 3-phase/dq-axes conversion is performed to the dead time compensation values and the voltage command values on the dq-axes are compensated by using the dead time compensation values on the dq-axes by the feed-forward control, is adopted. The compensation sign of the dead time is obtained by using the dq-axes steering assist command values, and the compensation amounts are variable so that the magnitude of the compensation amounts becomes optimal depending on the magnitude of the steering assist command value iqref and the magnitude of the inverter applying voltage VR.

Figure 29:
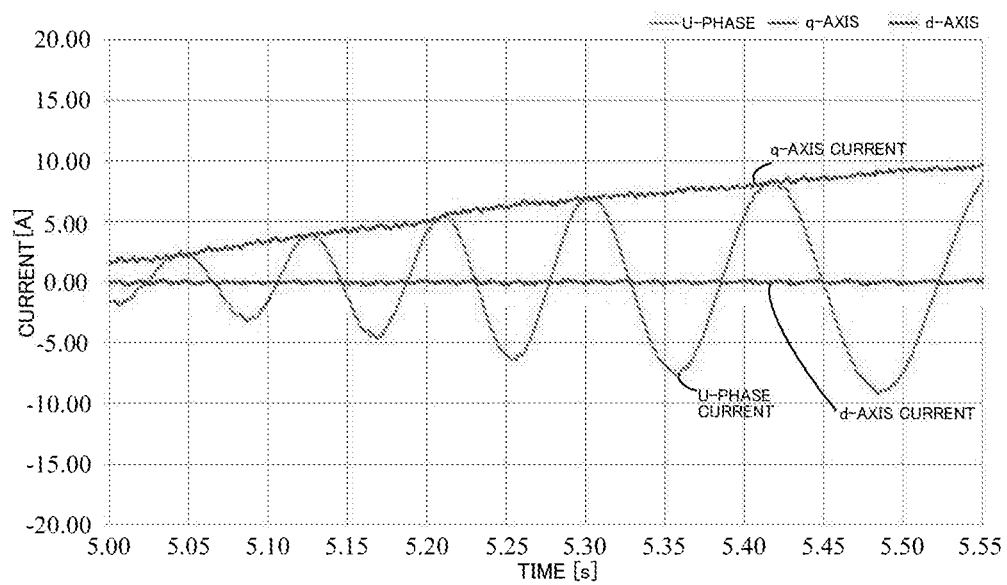
FIG. 29 is a waveform chart showing an effect of the present invention (the second embodiment)
Figure 30:
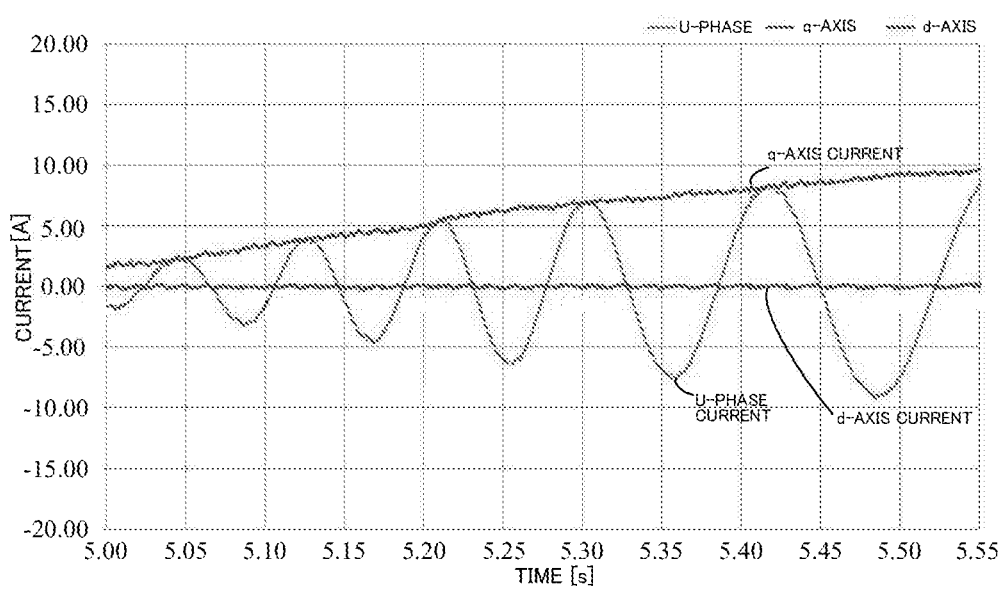
FIG. 30 is a waveform chart showing an effect of the present invention (the second embodiment)

FIGS. 29 and 30 are the simulation results showing the effects of the present invention (the second embodiment) in which the voltage command values on the dq-axes are compensated by the feed-forward control. FIG. 29 shows the U-phase current, the d-axis current and the q-axis current in a case of "without the dead time compensation". By applying the dead time compensation of the present embodiment, in the low speed and middle speed steering states, the improvements in the waveform distortions of the phase currents and the dq-axes currents as shown in FIG. 30 (the ripple is reduced in the dq-axes current waveforms and the phase currents whose waveforms are almost sinusoidal are obtained) can be confirmed. The torque ripple in the steering and the steering sound are also improved. FIGS. 29 and 30 typically show the U-phase current.

Figure 31:
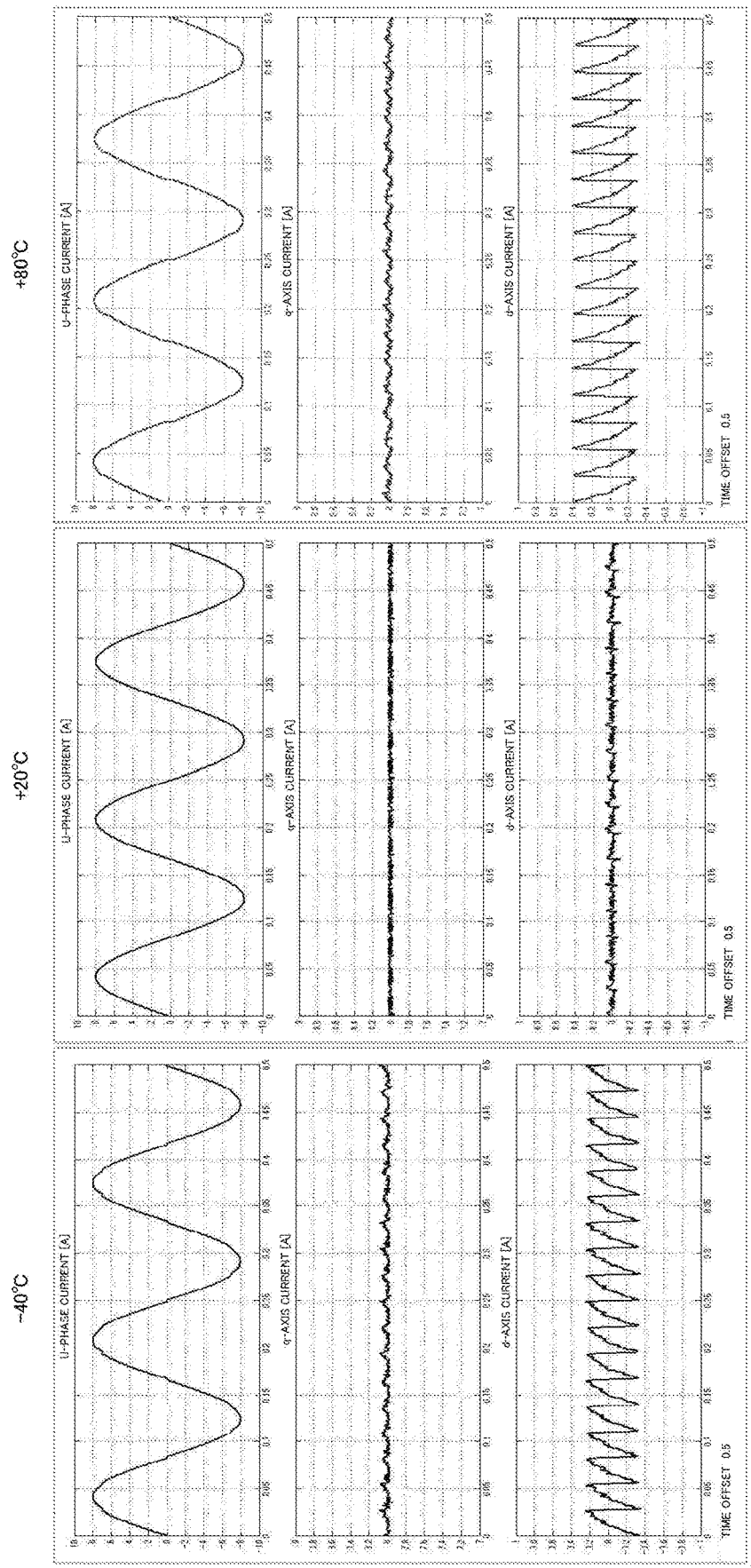
FIG. 31 is waveform charts showing an effect of the present invention (without the temperature correction)
Figure 32:
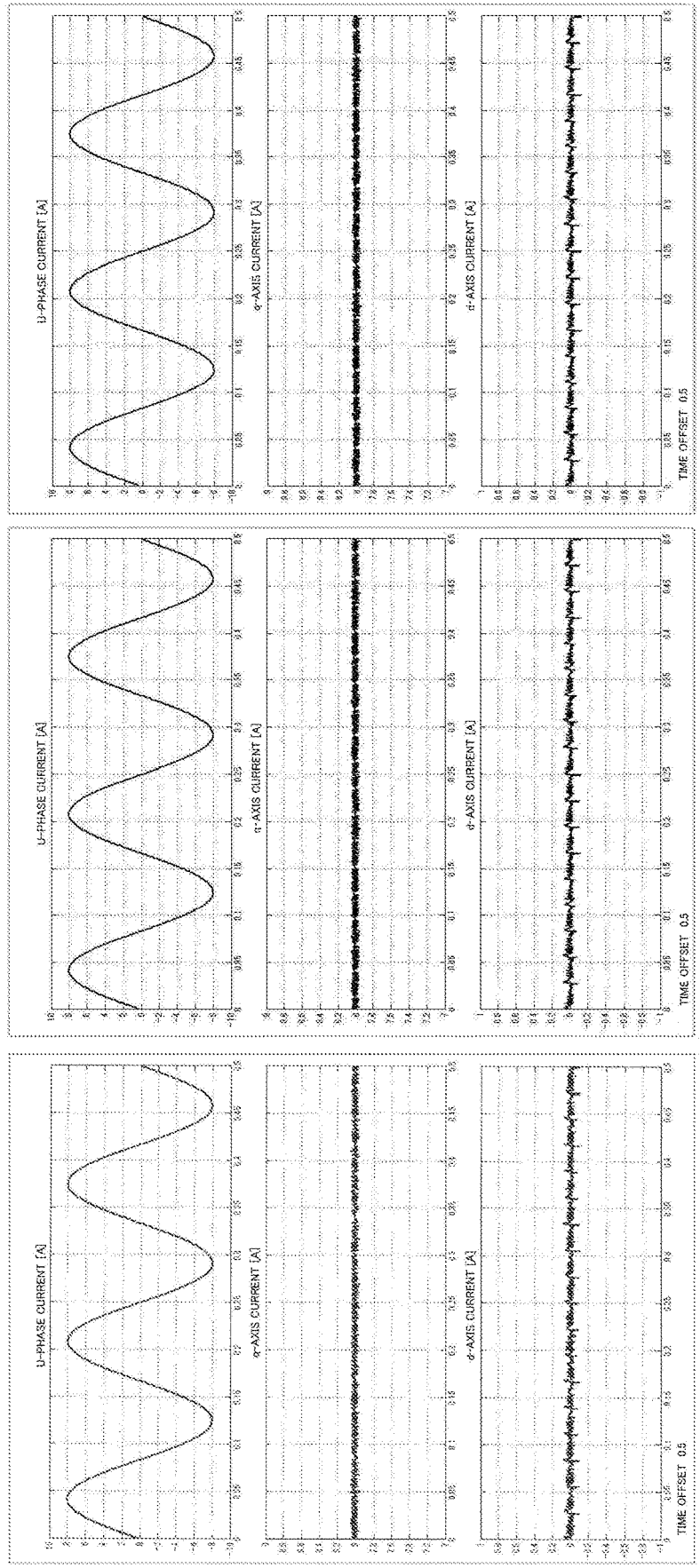
FIG. 32 is waveform charts showing an effect of the present invention (with the temperature correction)

In the low load and the low speed steering condition (the motor applying voltage=12[V], Iq=8 [A], Id=0 [A] and the motor rotational speed=120 [rpm]), the simulation results of "with the temperature correction" and "without the temperature correction" in a case that the temperature characteristic of the control section is shown in FIG. 24 are shown in FIGS. 31 and 32. FIG. 31 shows the results of "without the temperature correction" and FIG. 32 shows the results of "with the temperature correction". As shown in FIG. 31, because the compensation amount is appropriate in the 20 degrees Celsius temperature condition, the distortion of the current waveforms due to the dead time is not existed. Because of the shortage of the compensation amount in the −40 degrees Celsius temperature condition, the concave distortions are existed near 0 [A] of the U-phase current and the ripple is occurred in the dq-axes currents. Because of the excessive compensation amount in the 80 degrees Celsius temperature condition, the convex distortions are existed near 0 [A] of the U-phase current and the ripple is occurred in the dq-axes currents. As shown in FIG. 32, by adapting the temperature correction of the present invention and correcting the compensation amounts at every temperature, the improvements in the waveform distortions of the U-phase current and the dq-axes currents (the ripple is reduced in the dq-axes current waveforms and the phase currents whose waveforms are almost sinusoidal are obtained) can be confirmed in the respective temperature states and the torque ripple is also improved.

Next, the third embodiment which uses dq-axes dead time reference compensation values will be described.

Figure 33:
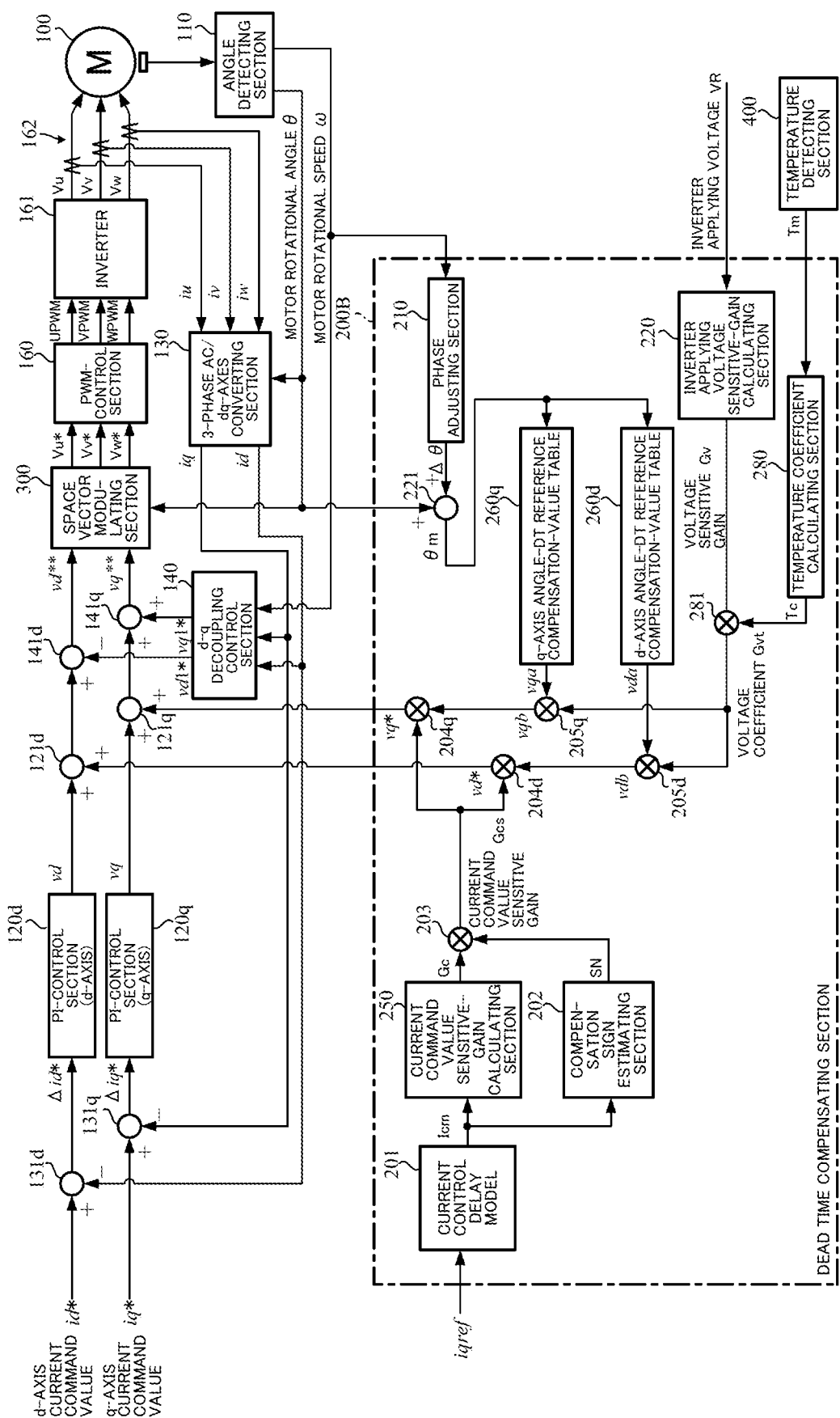
FIG. 33 is a block diagram showing a configuration example (the third embodiment) of the motor control unit of the present invention.
Figure 34:
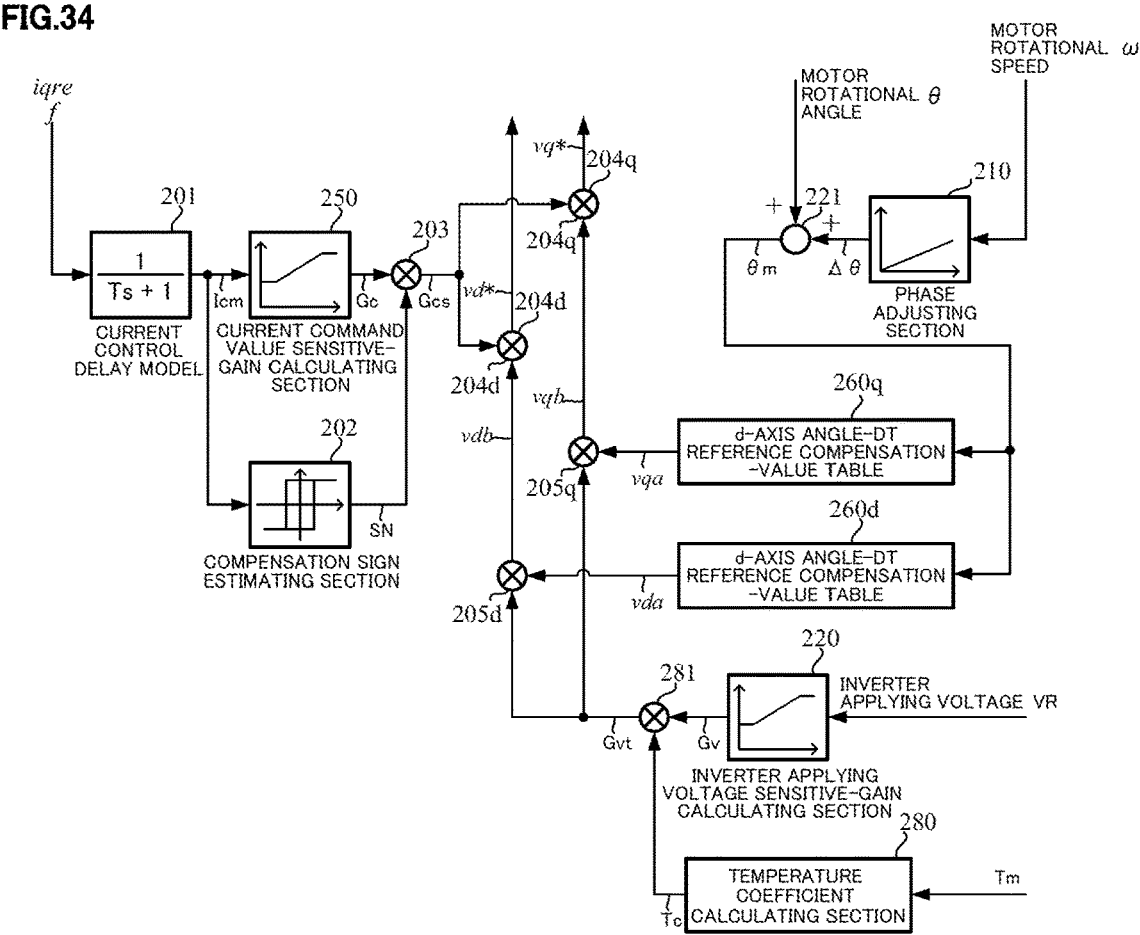
FIG. 34 is a block diagram showing a detail configuration example of the dead time compensating section.

FIG. 33 shows an overall configuration of the third embodiment corresponding to FIGS. 22 and 27, and the dead time compensating section 200B to calculate the dead time compensation values vd* and vq* on the dq-axes is disposed. The detail configuration of the dead time compensating section 200B is shown in FIG. 34. In the following, the explanation will be described with reference to FIG. 34.

The dead time compensating section 200B comprises the current control delay model 201, the compensation sign estimating section 202, the phase adjusting section 210, the inverter applying voltage sensitive-gain calculating section 220, the adding section 221, the multiplying section 203, 204d, 204q and 281 and the temperature coefficient calculating section 280 which have the same configurations as those in the first and second embodiments and perform the same operations as those in the first and second embodiments. In the third embodiment, a d-axis angle-dead time reference compensation-value table 260d to input the motor rotational angle θ$_m$ from the adding section 221 and output the d-axis dead time reference compensation value vda, and a q-axis angle-dead time reference compensation-value table 260q to input the motor rotational angle θ$_m$ from the adding section 221 and output the q-axis dead time reference compensation value vqa are disposed. The dead time reference compensation values vda and vqa are respectively inputted into the multiplying sections 205d and 205q and are multiplied by the corrected voltage coefficient G$_{vt}$, and the dead time compensation values vdb and vqb in which the voltage coefficient G$_{vt}$ is multiplied are respectively inputted into the multiplying sections 204d and 204q. The current command value sensitive gain G$_{cs}$ is also inputted into the multiplying sections 204d and 204q and the dead time compensation values vd* and vq* that are the results which multiply the dead time compensation values vdb and vqb by the current command value sensitive gain G$_{cs}$ are respectively outputted from the multiplying sections 204d and 204q.

Figure 35:
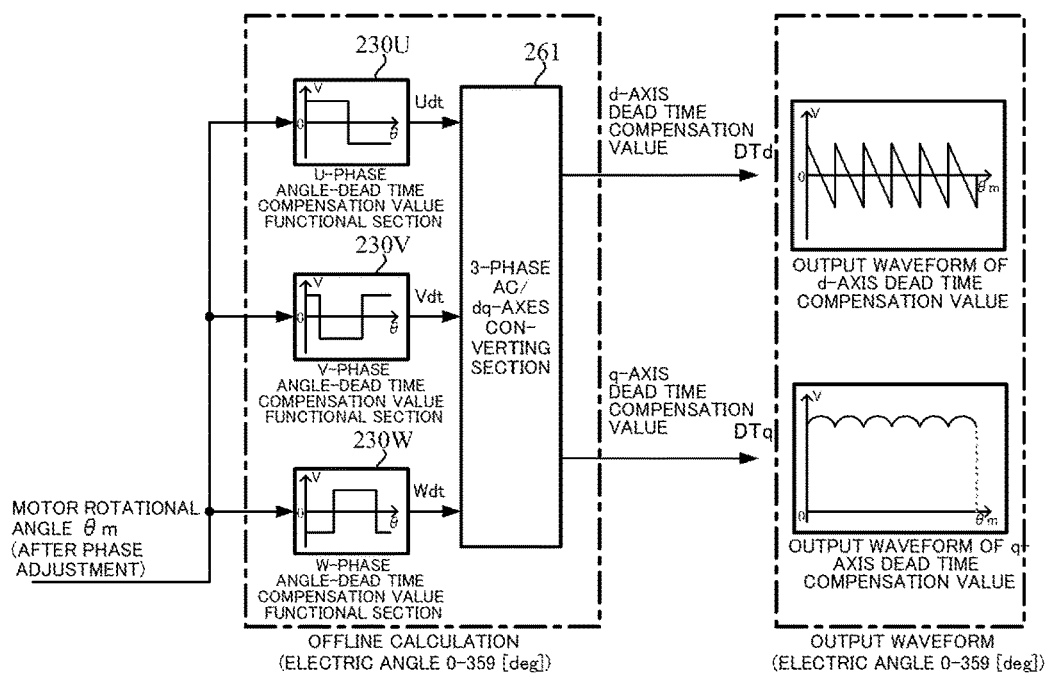
FIG. 35 is a diagram showing an operation example of a respective angle-dead time compensation value functional section.

As shown in FIG. 35 in detail, the dq-axes angle-dead time reference compensation-value tables 260d and 260q calculate the dead time compensation values which are needed in the 3-phases and are the functions of the angle in offline, and convert the dead time compensation values into the dead time compensation values on the dq-axes. That is, as described in the second embodiment, the 3-phase angle-dead time compensation value functional sections 230U, 230V and 230W respectively output respective phase rectangular wave dead time reference compensation values Udt, Vdt and Wdt whose phases are shifted each other by 120 [deg] in a range of 0 to 359 [deg] in the electrical angle, to the phase-adjusted motor rotational angle θ$_m$. The 3-phase angle-dead time compensation value functional sections 230U, 230V and 230W treat the dead time compensation values, which are needed in the 3-phases, as functions depending on the angle, calculate the dead time compensation values in offline, and output the 3-phase dead time reference compensation values Udt, Vdt and Wdt. The angle functions of the 3-phase dead time reference compensation values Udt, Vdt and Wdt are different depending on the characteristic of the dead time in the ECU.

Figure 36A:
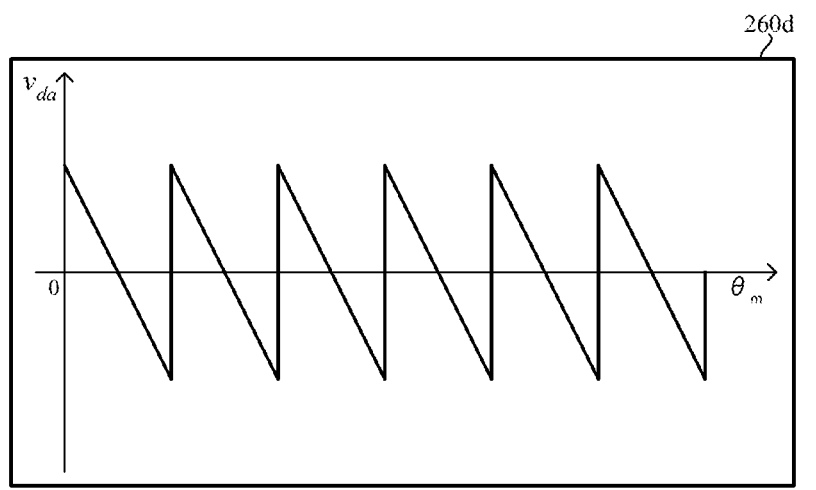
FIGS. 36A and 36B are characteristic diagrams showing output voltage characteristics of the dq-axes angle-dead time reference compensation-value table.
Figure 36B:
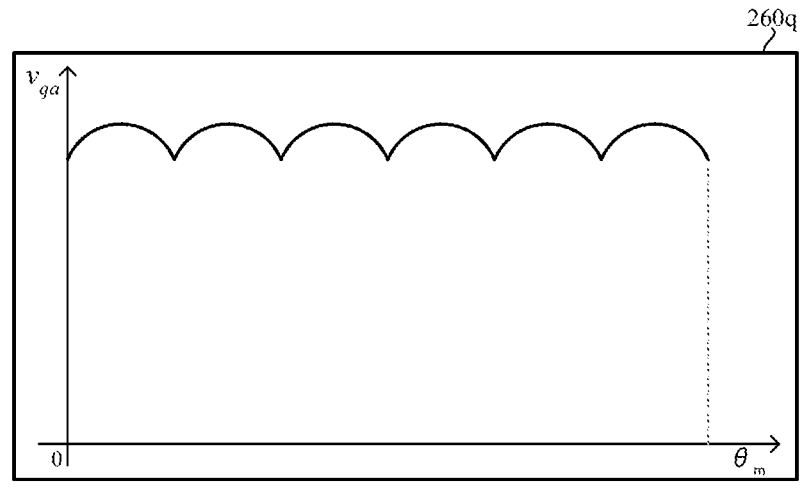

The 3-phase dead time reference compensation values Udt, Vdt and Wdt are inputted into the 3-phase AC/dq-axes converting section 261 and are converted into the dq-axes dead time compensation values DTd and DTq whose output waveforms are shown in FIG. 35. The dq-axes angle-dead time reference compensation-value tables 260d and 260q whose input is the angle θ$_m$ are generated based on the dq-axes output waveforms in FIG. 35. As shown in FIG. 36A, the d-axis angle-dead time reference compensation-value table 260d has an output voltage characteristic (the d-axis dead time reference compensation value) having a sawtooth waveform to the motor rotational angle θ$_m$. As shown in FIG. 36B, the q-axis angle-dead time reference compensation-value table 260q has an output voltage characteristic (the q-axis dead time reference compensation value) whose waveform is continuous arcs which are added with the offset voltage.

The dead time reference compensation values vda and vqa from the dq-axes angle-dead time reference compensation-value tables 260d and 260q are respectively inputted into the multiplying section 205d and 205q, and are multiplied by the voltage coefficient G$_{vt}$. The dead time compensation values vda* and vqa* which are multiplied by the voltage coefficient G$_{vt}$ are respectively inputted into the multiplying sections 204d and 204q, and are multiplied by the current command value sensitive gain G$_{cs}$. The dead time compensation values vd* and vq* from the multiplying sections 204q and 204q are respectively inputted into the adding sections 121d and 121q, are added to the voltage command values vd and vq and the added results are inputted into the space vector modulating section 300 as the voltage command values vd and vq.

In the third embodiment, the configuration that the dead time compensation values are calculated from the dq-axes angle-dead time reference compensation-value table which is a function depending on the motor rotational angle (the electric angle) and the dead time compensation values which are corrected by the temperature dependent table compensate the voltage command values on the dq-axes by the feed-forward control, is adopted. The compensation sign of the dead time is obtained by using the steering assist command value (iqref), and the compensation amounts are variable so that the magnitude of the compensation amounts becomes optimal depending on the magnitude of the steering assist command value and the magnitude of the inverter applying voltage.

Figure 37:
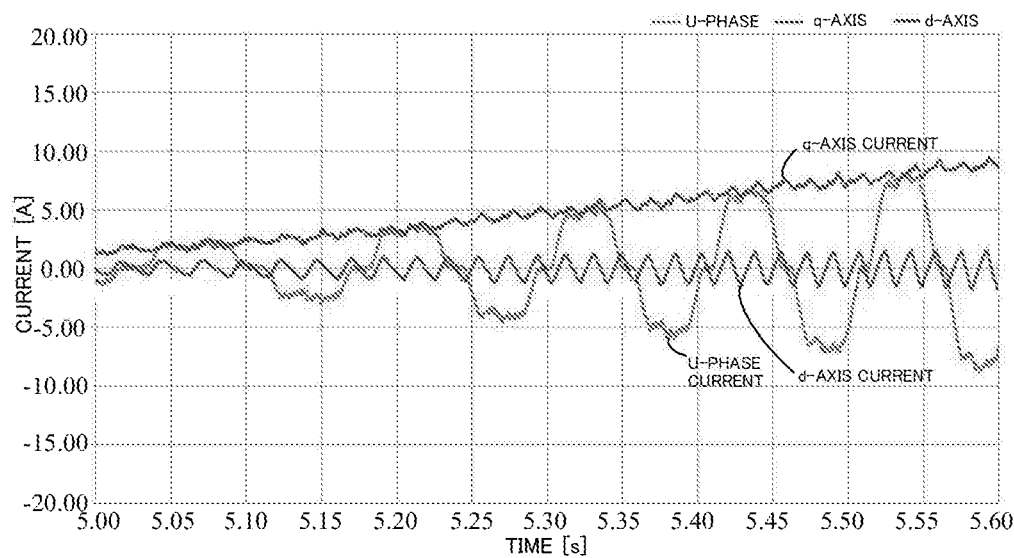
FIG. 37 is a waveform chart showing an effect of the present invention (the third embodiment)
Figure 38:
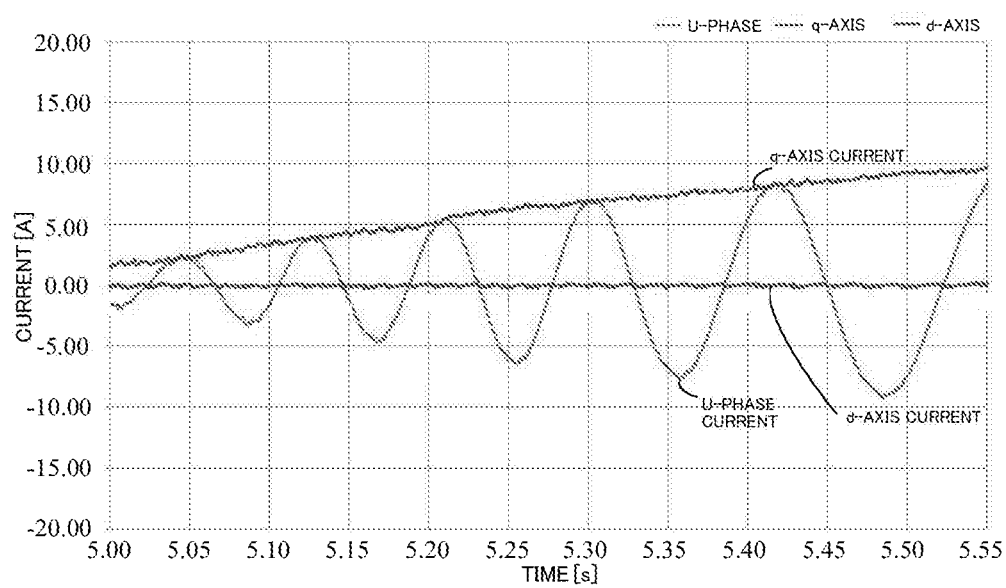
FIG. 38 is a waveform chart showing an effect of the present invention (the third embodiment).

FIGS. 37 and 38 are the simulation results showing the effects of the third embodiments in the U-phase, and FIG. 37 shows the U-phase current, the d-axis current and the q-axis current in a case of "without the dead time compensation". By applying the dead time compensation of the present invention, in the low speed and middle speed steering states, the improvements in the waveform distortions of the phase currents and the dq-axes currents as shown in FIG. 38 (the ripple is reduced in the dq-axes current waveforms and the phase currents whose waveforms are almost sinusoidal are obtained) can be confirmed. The torque ripple in the steering and the steering sound are also improved.

In the above embodiments, the motor control unit which installed in the electric power steering apparatus has been described. The motor control unit according to the present invention can naturally be installed in the electric vehicle, the machine tool and the like.

EXPLANATION OF REFERENCE NUMERALS 1 handle (steering wheel)
2 column shaft (steering shaft, handle shaft)
20, 100 motor
30 control unit (ECU)
31 steering assist command value calculating section
35, 203, 204 PI-control section
36, 160 PWM-control section
37, 161 inverter
110 angle detecting section
130, 290 3-phase AC/dq-axes converting section
140 d-q decoupling control section
200, 200A, 200B dead time compensating section
201 current control delay model
202 compensation sign estimating section
210 phase adjusting section 220 inverter applying voltage sensitive-gain calculating section
230U, 230V, 230W angle-dead time compensation value functional section
240 compensation value adjusting section
250 current command value sensitive-gain calculating section
280 temperature coefficient calculating section
300 space vector modulating section
301 2-phase/3-phase converting section
302 third-harmonic superimposition section
400 temperature detecting section

The invention claimed is:

1. A vector control type motor control unit that calculates dq-axes control assist command values, calculates dq-axes current command values from said dq-axes control assist command values, converts said dq-axes current command values into 3-phase duty command values, and drives and controls a 3-phase brushless motor by an inverter of a pulse width modulation (PWM) control, comprising:
a central processing unit (CPU) configured to execute instruction to perform a dead time compensation of said inverter by adding 3-phase dead time compensation values, which are obtained by calculating 3-phase dead time reference compensation values based on a motor rotational angle and temperature-correcting said 3-phase dead time reference compensation values, to space-vector-modulated 3-phase voltage command values, which are obtained by converting said dq-axes current command values into 3-phase voltage command values and superimposing third-harmonic on said 3-phase voltage command values.

2. The vector control type motor control unit according to claim 1,
wherein said central processing unit is further configured to execute instructions to adjust said 3-phase dead time compensation values based on said dq-axes control assist command values.

3. A vector control type motor control unit that calculates dq-axes control assist command values, calculates dq-axes current command values from said dq-axes control assist command values, converts said dq-axes current command values into 3-phase duty command values, and drives and controls a 3-phase brushless motor by an inverter, which is constituted by a bridge circuit of field-effect transistors (FETs), of a pulse width modulation (PWM) control, comprising:
a central processing unit (CPU) which is configured to execute instructions to:
obtain 3-phase voltage command values by performing a space vector modulation for dq-axes voltage command values;
calculate 3-phase dead time reference compensation values based on a motor rotational angle;
calculate a voltage sensitive gain based on an inverter applying voltage;
detect or estimate a temperature of a control section including said inverter;
output a temperature coefficient depending on said temperature;
calculate a current command value sensitive gain in which compensation amounts of 3-phase dead time compensation values are variable depending on said dq-axes control assist command values;
multiply said 3-phase dead time reference compensation values by a voltage coefficient obtained by multiplying said voltage sensitive gain by said temperature coefficient, multiply said multiplied results by said current command value sensitive gain and output said 3-phase dead time compensation values; and
perform a dead time compensation of said inverter by adding said 3-phase dead time compensation values to said 3-phase voltage command values.

4. The vector control type motor control unit according to claim 3,
wherein said central processing unit is further configured to execute instructions to measure said compensation amounts being required at three points of a compensation-amount setting temperature, a performance-guarantee temperature upper-limit and a performance-guarantee temperature lower-limit, set a value at said compensation-amount setting temperature as a reference value, calculate a ratio of a value at said performance-guarantee temperature upper-limit to said reference value and a ratio of a value at said performance-guarantee temperature lower-limit to said reference value, and calculate said temperature coefficient.

5. The vector control type motor control unit according to claim 4,
wherein limit-values to said performance-guarantee temperature upper-limit and said performance-guarantee temperature lower-limit, are set.

6. The vector control type motor control unit according to claim 4,
wherein a ratio between said three points is generated by a linear interpolation calculation or using a data table to said temperature.

7. The vector control type motor control unit according to claim 3,
wherein said central processing unit is further configured to execute instructions to:
multiply said 3-phase dead time reference compensation values by said voltage coefficient; and
multiply 3-phase outputs from said multiplying sections by said current command value sensitive gain and output said 3-phase dead time compensation values.

8. The vector control type motor control unit according to claim 3,
wherein a phase of said motor rotational angle is variable depending on a motor rotational speed.

9. An electric power steering apparatus that is equipped with the vector control type motor control unit according to claim 3, and applies an assist torque to a steering system of a vehicle.

10. A vector control type motor control unit that calculates dq-axes control assist command values, calculates dq-axes voltage command values from said dq-axes control assist command values, converts said dq-axes voltage command values into 3-phase duty command values, and drives and controls a 3-phase brushless motor by an inverter, which is constituted by a bridge circuit of field-effect transistors (FETs), of a pulse width modulation (PWM) control, comprising:
a central processing unit (CPU) configured to execute instructions to:
calculate 3-phase dead time reference compensation values based on a motor rotational angle;
calculate a voltage sensitive gain based on an inverter applying voltage;
detect or estimate a temperature of a control section including said inverter;
output a temperature coefficient depending on said temperature; and multiply said 3-phase dead time reference compensation values by a voltage coefficient obtained by multiplying said voltage sensitive gain by said temperature coefficient, obtain dq-axes dead time compensation values by converting said multiplied results on dq-axes, and add said dq-axes dead time compensation values to said dq-axes voltage command values.

11. The vector control type motor control unit according to claim 10,
wherein said central processing unit is further configured to execute instructions to measure dead time compensation amounts being required at three points of a compensation-amount setting temperature, a performance-guarantee temperature upper-limit and a performance-guarantee temperature lower-limit, set a value at said compensation-amount setting temperature as a reference value, calculate a ratio of a value at said performance-guarantee temperature upper-limit to said reference value and a ratio of a value at said performance-guarantee temperature lower-limit to said reference value, and calculates said temperature coefficient.

12. The vector control type motor control unit according to claim 11,
wherein limit-values to said performance-guarantee temperature upper-limit and said performance-guarantee temperature lower-limit, are set.

13. The vector control type motor control unit according to claim 11,
wherein a ratio between said three points is generated by a linear interpolation calculation or using a data table to said temperature.

14. The vector control type motor control unit according to claim 10,
said central processing unit is further configured to execute instructions to make said dq-axes dead time compensation values be variable depending on said dq-axes control assist command values.

15. The vector control type motor control unit according to claim 10,
wherein said central processing unit is further configured to execute instructions to:
multiply said 3-phase dead time reference compensation values by said voltage coefficient; and
convert 3-phase outputs from said multiplying sections into said dq-axes dead time compensation values.

16. The vector control type motor control unit according to claim 10,
wherein a phase of said motor rotational angle is variable depending on a motor rotational speed.

17. An electric power steering apparatus that is equipped with the vector control type motor control unit according to claim 10, and applies an assist torque to a steering system of a vehicle.

18. A vector control type motor control unit that calculates dq-axes control assist command values, calculates dq-axes voltage command values from said dq-axes control assist command values, converts said dq-axes voltage command values into 3-phase duty command values, and drives and controls a 3-phase brushless motor by an inverter, which is constituted by a bridge circuit of field-effect transistors (FETs), of a pulse width modulation (PWM) control, comprising:
a central processing unit (CPU) configured to execute instructions to:
calculate dq-axes dead time reference compensation values based on a motor rotational angle;
calculate a voltage sensitive gain based on an inverter applying voltage;
detect or estimate a temperature of a control section including said inverter;
output a temperature coefficient depending on said temperature; and
obtain dq-axes dead time compensation values by multiplying said dq-axes dead time reference compensation values by a voltage coefficient obtained by multiplying said voltage sensitive gain by said temperature coefficient, and output said dq-axes dead time compensation values.

19. The vector control type motor control unit according to claim 18,
wherein said central processing unit is further configured to execute instructions to measure required dead time compensation amounts at three points of compensation-amount setting temperature, a performance-guarantee temperature upper-limit and a performance-guarantee temperature lower-limit, set a value at said compensation-amount setting temperature as a reference value, calculate a ratio of a value at said performance-guarantee temperature upper-limit to said reference value and a ratio of a value at said of performance-guarantee temperature lower-limit to said reference value, and calculate said temperature coefficient.

20. The vector control type motor control unit according to claim 19,
wherein limiting values to said performance-guarantee temperature upper-limit and said performance-guarantee temperature lower-limit, are set.

21. The vector control type motor control unit according to claim 19,
wherein a ratio between said three points is generated by a linear interpolation calculation or using a data table to said temperature.

22. The vector control type motor control unit according to claim 18,
wherein a phase of said motor rotational angle is variable depending on a motor rotational speed.

23. An electric power steering apparatus that is equipped with the vector control type motor control unit according to claim 18, and applies an assist torque to a steering system of a vehicle.

* * * * *